United States Patent
Park et al.

(10) Patent No.: US 10,671,115 B2
(45) Date of Patent: *Jun. 2, 2020

(54) USER TERMINAL DEVICE AND DISPLAYING METHOD THEREOF

(71) Applicant: SAMSUNG ELECTRONICS CO., LTD., Suwon-si (KR)

(72) Inventors: Hae-yoon Park, Seoul (KR); Ji-yeon Kwak, Seoul (KR); Yeo-jun Yoon, Suwon-si (KR); Yun-kyung Kim, Suwon-si (KR); Hyun-jin Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/513,083

(22) Filed: Jul. 16, 2019

(65) Prior Publication Data

US 2019/0339740 A1 Nov. 7, 2019

Related U.S. Application Data

(63) Continuation of application No. 14/618,476, filed on Feb. 10, 2015, now Pat. No. 10,379,573.

(Continued)

(30) Foreign Application Priority Data

Jul. 15, 2014 (KR) ........................ 10-2014-0088814

(51) Int. Cl.
*G06F 3/041* (2006.01)
*G06F 1/16* (2006.01)
(Continued)

(52) U.S. Cl.
CPC .......... *G06F 1/1616* (2013.01); *G06F 1/1641* (2013.01); *G06F 1/1643* (2013.01);
(Continued)

(58) Field of Classification Search
CPC .... G06F 1/1616; G06F 1/1641; G06F 1/1643; G06F 1/1677; G06F 2203/04803; G06F 3/0487; G06F 3/0488
See application file for complete search history.

(56) References Cited

U.S. PATENT DOCUMENTS 6,466,369 B1 10/2002 Maddock
8,860,632 B2 10/2014 Kilpatrick, II et al.
(Continued)

FOREIGN PATENT DOCUMENTS

CN 101674361 A 3/2010
CN 102150094 A 8/2011
(Continued)

OTHER PUBLICATIONS

Communication dated Apr. 19, 2019, issued by the USPTO in counterpart U.S. Appl. No. 15/893,366.
(Continued)

*Primary Examiner* — Insa Sadio
(74) *Attorney, Agent, or Firm* — Sughrue Mion, PLLC

(57) ABSTRACT

A user terminal device and a displaying method thereof are provided. The user terminal device includes a display configured to be divided into a plurality of display areas along a plurality of folding lines, a plurality of hinges configured to support the display along the plurality of folding lines, a detector configured to detect a bending state of the display along the plurality of folding lines, and a controller configured to, in response to a detection of the display being bent along at least one of the plurality of folding lines, control the
(Continued)

display to display information in the plurality of display areas based on a bending state of the display.

6 Claims, 32 Drawing Sheets

Related U.S. Application Data

(60) Provisional application No. 61/937,778, filed on Feb. 10, 2014.

(51) Int. Cl.
  *G06F 3/0487*  (2013.01)
  *G06F 3/0488*  (2013.01)
(52) U.S. Cl.
  CPC .......... *G06F 1/1677* (2013.01); *G06F 3/0487* (2013.01); *G06F 3/0488* (2013.01); *G06F 2203/04803* (2013.01)

(56) References Cited

U.S. PATENT DOCUMENTS

| | | | |
|---|---|---|---|
| 8,866,840 | B2 | 10/2014 | Dahl et al. |
| 9,009,984 | B2 | 4/2015 | Caskey et al. |
| 9,052,769 | B2 | 6/2015 | Choi et al. |
| 9,152,225 | B2 | 10/2015 | Park et al. |
| 9,173,306 | B2 | 10/2015 | Lim et al. |
| 9,489,078 | B2 | 11/2016 | Seo et al. |
| 9,489,079 | B2 | 11/2016 | Seo et al. |
| 9,489,080 | B2 | 11/2016 | Seo et al. |
| 2004/0008191 | A1 | 1/2004 | Poupyrev et al. |
| 2007/0205997 | A1 | 9/2007 | Lieshout et al. |
| 2009/0224999 | A1 | 9/2009 | Kuwahara et al. |
| 2010/0060548 | A1 | 3/2010 | Choi et al. |
| 2010/0064536 | A1 | 3/2010 | Caskey et al. |
| 2010/0008527 | A1 | 4/2010 | Kilpatrick, II et al. |
| 2010/0085274 | A1 | 4/2010 | Kilpatrick, II et al. |
| 2011/0057873 | A1 | 3/2011 | Geissler et al. |
| 2011/0216064 | A1* | 9/2011 | Dahl .................... G06F 1/1616 345/428 |
| 2011/0241998 | A1 | 10/2011 | McKinney et al. |
| 2012/0094718 | A1 | 4/2012 | Kim |
| 2012/0262367 | A1 | 10/2012 | Chiu et al. |
| 2012/0280924 | A1 | 11/2012 | Kummer et al. |
| 2013/0073473 | A1* | 3/2013 | Heath .................... G06Q 30/02 705/319 |
| 2013/0162663 | A1 | 6/2013 | Mano et al. |
| 2013/0215011 | A1 | 8/2013 | Ke |
| 2013/0217443 | A1 | 8/2013 | Lim et al. |
| 2013/0321264 | A1 | 12/2013 | Park et al. |
| 2013/0321340 | A1 | 12/2013 | Seo et al. |
| 2014/0015745 | A1 | 1/2014 | Chae et al. |
| 2014/0028596 | A1 | 1/2014 | Seo et al. |
| 2014/0035869 | A1 | 2/2014 | Yun et al. |
| 2014/0313143 | A1 | 10/2014 | Jung et al. |
| 2015/0138103 | A1* | 5/2015 | Nishi .................... G02F 1/13452 345/173 |
| 2015/0227224 | A1 | 8/2015 | Park et al. |
| 2015/0309691 | A1 | 10/2015 | Seo et al. |
| 2015/0378503 | A1 | 12/2015 | Seo et al. |
| 2017/0052698 | A1 | 2/2017 | Seo et al. |

FOREIGN PATENT DOCUMENTS

| | | |
|---|---|---|
| CN | 102187296 A | 9/2011 |
| CN | 102736691 A | 10/2012 |
| CN | 103259886 A | 8/2013 |
| CN | 103455138 A | 12/2013 |
| CN | 103477304 A | 12/2013 |
| KR | 10-2010-0019164 A | 2/2010 |
| KR | 10-2012-0102293 A | 9/2012 |
| KR | 10-2013-0096048 A | 8/2013 |
| KR | 1020130099664 A | 9/2013 |
| KR | 10-1320252 B1 | 10/2013 |
| WO | 2010028399 A1 | 3/2010 |

OTHER PUBLICATIONS

Communication dated Apr. 25, 2019, issued by the Korean Intellectual Property Office in corresponding Korean Application No. 10-2014-0088814.
Communication dated Aug. 24, 2018, issued by the State Intellectual Property Office of P.R. China in counterpart Chinese Application No. 201580007994.2.
Communication dated Dec. 29, 2016 issued by United States Patent and Trademark Office in counterpart U.S. Appl. No. 14/618,476.
Communication dated Feb. 27, 2017, issued by the United States Patent and Trademark Office in counterpart U.S. Appl. No. 14/618,517.
Communication dated Jan. 25, 2019, issued by the Korean Intellectual Property Office in counterpart Korean Patent Application No. 10-2014-0089251.
Communication dated Jul. 12, 2018, issued by the State Intellectual Property Office of P.R. China in counterpart Chinese Application No. 201580007834.8.
Communication dated Jul. 12, 2018, issued by the State Intellectual Property Office of the People's Republic of China in counterpart Chinese Patent Application No. 201580007834.8.
Communication dated Jul. 29, 2016 issued by the U.S. Patent and Trademark Office in counterpart U.S. Appl. No. 14/618,517.
Communication dated Jun. 18, 2019, issued by the Korean Intellectual Property Office in corresponding Korean Application No. 10-2014-0088814.
Office Action dated Jun. 3, 2016 issued by United States Patent and Trademark Office in counterpart U.S. Appl. No. 14/618,479.
Communication dated May 17, 2019, from the State Intellectual Property Office of People's Republic of China in counterpart Application No. 201580007834.8.
Communication dated May 2, 2018, issued by the United States Patent and Trademark Office in counterpart U.S. Appl. No. 14/618,476.
Communication dated Nov. 16, 2018, issued by the European Patent Office in counterpart European Patent Application No. 15746551.9.
Communication dated Sep. 18, 2018, issued by the Korean Intellectual Property Office in counterpart Korean Patent Application No. 10-2014-0088814.
Communication dated Sep. 4, 2018 issued by the U.S. Patent Office in counterpart U.S. Appl. No. 14/618,476.
Communication dated Jul. 14, 2017, issued by the European Patent Office in counterpart European Patent Application No. 15746478.5.
Communication dated Jul. 14, 2017, issued by the European Patent Office in counterpart European Patent Application No. 15746551.9.
Final Office Action dated Dec. 29, 2016 issued by United States Patent and Trademark Office in U.S. Appl. No. 14/618,476.
Office Action dated Sep. 27, 2017, issued by the United States Patent and Trademark Office in U.S. Appl. No. 14/618,476.
Search Report dated Apr. 29, 2015, issued by the International Searching Authority in counterpart International Application No. PCT/KR2015/001348.
Search Report dated May 11, 2015 issued by the International Searching Authority in counterpart International Patent Application No. PCT/KR2015/001336 (PCT/ISA/210).
Written Opinion dated Apr. 29, 2015, issued by the International Searching Authority in counterpart International Application No. PCT/KR2015/001348.
Written Opinion dated May 11, 2015 issued by the International Searching Authority in counterpart International Patent Application No. PCT/KR2015/001336 (PCT/ISA/237).
Notice of Allowance dated Mar. 20, 2019, issued by the United States Patent and Trademark Office in U.S. Appl. No. 14/618,476.
Office Action dated Sep. 4, 2018 issued by the United States Patent and Trademark Office in U.S. Appl. No. 14/618,476.
Final Office Action dated May 2, 2018 issued in the United States Patent Office in U.S. Appl. No. 14/618,476.

(56) References Cited

OTHER PUBLICATIONS

Communication dated Nov. 6, 2019 issued by the State Intellectual Property Office of P.R. China in counterpart Chinese Application No. 201580007834.8.
Communication dated Dec. 16, 2019 issued by the Korean Intellectual Property Office in counterpart Korean Application No. 10-2019-0114139.
Communication dated Mar. 18, 2020, issued by the Indian Patent Office in counterpart Indian Application No. 201617029936.
Communication dated Mar. 24, 2020, issued by the State Intellectual Property Office of P.R. China in counterpart Chinese Application No. 201580007834.8.
Communication dated Apr. 20, 2020, issued by the Indian Patent Office in counterpart Indian Application No. 201617029933.

* cited by examiner

PHONE MODE

TABLET MODE

Bend ↓

Unfold ↓

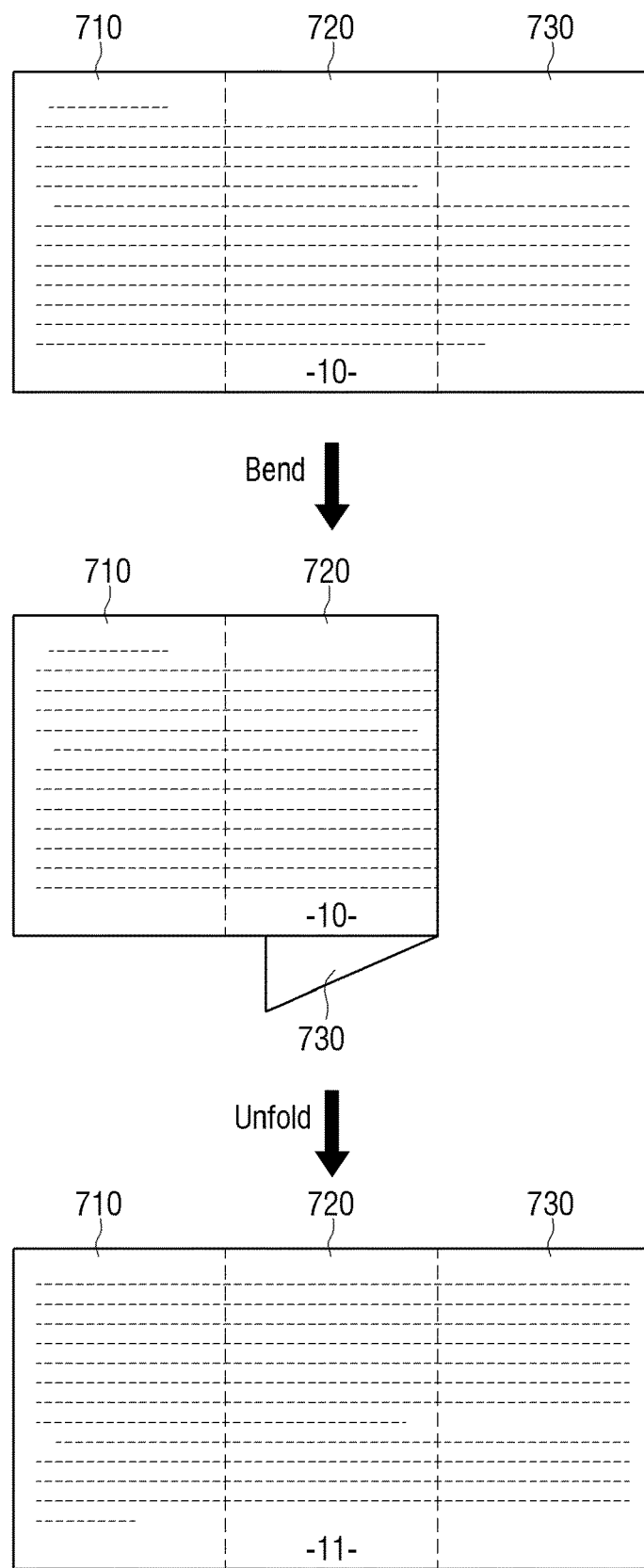

<FRONT>

<BACK>

USER TERMINAL DEVICE AND DISPLAYING METHOD THEREOF

CROSS-REFERENCE TO RELATED APPLICATIONS

This is a continuation of U.S. patent application Ser. No. 14/618,476 filed Feb. 10, 2015, which claims priority from Korean Patent Application No. 10-2014-0088814 filed on Jul. 15, 2014, in the Korean Intellectual Property Office, and the benefit of U.S. Provisional Application No. 61/937,778 filed on Feb. 10, 2014, in the United States Patent and Trademark Office, the disclosures of which are incorporated herein by reference in their entireties.

BACKGROUND

1. Field

Aspects of the exemplary embodiments relate to a user terminal device and a displaying method thereof, and more particularly, to a user terminal device, display of which is divided into a plurality of display areas by a plurality of hinges, and a displaying method thereof.

2. Description of the Related Art

With the development of electronic technology, various types of user terminal devices have been developed and distributed. Recently, the size of such user terminal devices has been minimized while the functions of the devices have become diverse and thus, the demands for user terminal devices have been continuously increasing.

A user terminal device may provide various contents, such as multimedia contents and application screens based on a user's request. A user may select a desired function using a button or a touch screen provided on a user terminal device. A user terminal device may selectively execute a program, according to a user interaction and display the result of execution.

As a user terminal device provides increasingly diverse functions, there is a growing need for a method of displaying contents and a user interface method. In other words, as the method of displaying contents has changed, and the type and function of contents have been increasing, the existing interaction method of simply selecting a button or touching a screen may be insufficient to efficiently perform the various functions of a user terminal device.

Accordingly, there is an increasing need of a user interaction method which enables a user to more conveniently and efficiently use a user terminal device.

SUMMARY

An aspect of the exemplary embodiments relates to a user terminal device which provides various functions according to a bending state of a display divided into a plurality of display areas by a plurality of hinges and a displaying method thereof.

According to an aspect of an exemplary embodiment, a user terminal device includes a display configured to be divided into a plurality of display areas along a plurality of folding lines, a plurality of hinges configured to support the display along the plurality of folding lines, a detector configured to detect a bending state of the display along the plurality of folding lines, and a controller configured to, in response to a detection of the display being bent along at least one of the plurality of folding lines, control the display to display information in the plurality of display areas based on a bending state of the display.

The plurality of hinges comprises a first hinge and a second hinge, and the display is divided into a first display area and a second display area with reference to the first hinge and divided into the second display area and a third display area with reference to the second hinge.

The user terminal device further includes a memory, wherein in response to a detection of a bending interaction of bending the first display area in a first direction at an angle within a first predetermined angle range with reference to the first hinge while an image content is displayed on the display when the display is in a unfolded state, the controller is further configured to store the image content in a first area in the memory, and in response to a detection of a bending interaction of bending the third display area in a second direction at an angle within a second predetermined angle range with reference to the second hinge while an image content is displayed on the display when the display is in a unfolded state, the controller is further configured to store the image content in a second area in the memory.

In response to a detection of a bending interaction of bending the first display area in a first direction with reference to the first hinge and unfolding the first display area while a first page of an electronic book (E-book) is displayed on the display when the display is in a unfolded state, the controller is further configured to control the display to display a previous page of the E-book, and in response to a detection of a bending interaction of bending the third display area in a second direction with reference to the second hinge and unfolding the third display area while the first page of the E-book content is displayed on the display when the display is in a unfolded state, the controller is further configured to control the display to display a next page of the E-book.

In response to a detection of a bending interaction of bending the display so that a shape of the display is changed while an execution screen of a first application is displayed on the display when the display is in a unfolded state, the controller is further configured to control the display to display an execution screen of a different application in the first display area and the third display area based on the changed shape.

In response to a detection of a bending interaction of bending the display such that the first display area is located higher than the third display area while an execution screen of the first application is displayed on the display when the display is in a unfolded state, the controller is further configured to control the display to display an execution screen of a second application corresponding to a most recently displayed guide message in the first display area and display at least a part of the execution screen of the first application in the third display area, and in response to a detection of a bending interaction of bending the display such that the third display area is located higher than the first display area while the execution screen of the first application is displayed on the display when the display is in a unfolded state, the controller is further configured to control the display to display an execution screen of a third application, related to the first application, in the third display area and display at least a part of the execution screen of the first application in the first display area.

In response to a detection of a bending interaction of bending the display so that a display area among the first display area, the second display area and the third display areas is located higher than other display areas being detected through the detector while the first, second and third display areas display a first screen, a second screen and a third screens respectively, the controller is further configured to capture a screen displayed in the display area located above the other display areas.

In response to the first display area being detected through the detector as being bent in a direction of a rear side of the display at an angle within a predetermined angle range with reference to the first hinge, the controller is further configured to control the display to display a first image in the first display area and display a second image in the second display area and the third display area.

In response to the first display area being detected through the detector as being bent in the direction of the rear side of the display at an angle within the predetermined angle range with reference to the first hinge while a camera application is executed, the controller is further configured to control the display to display an image content in the first display area and display a live view image obtained from a camera of the user terminal device in the second display area and the third display area.

In response to the first display area being detected through the detector as being bent in the direction of the rear side of the display at an angle within a first predetermined angle range with reference to the first hinge and in response to the third display area being detected through the detector as being bent in a direction of a front side of the display at an angle within a second predetermined angle range while a shopping application is executed, the controller is further configured to control the display to display a shopping item that a first user searches in the first display area, to display a shopping item that a second user wishes to share in the second display area, and to display a shopping item that the second user searches in the third display area.

According to another aspect of another exemplary embodiment, a displaying method of a user terminal device includes displaying an image on a display configured to be divided into a plurality of display areas along a plurality of folding lines, detecting a bending state of the display along the plurality of folding lines, and displaying information in the plurality of display areas based on the bending state of the display in response to the display being bent by at least one of a plurality of hinges along at least one of the plurality of folding lines.

The plurality of hinges comprises a first hinge and a second hinge, wherein the display is divided into a first display area and a second display area with reference to the first hinge and divided into the second display area and a third display area with reference to the second hinge.

In response to a detection of a bending interaction of bending the first display area in a first direction at an angle within a first predetermined angle range with reference to the first hinge while an image content is displayed on the display when the display is in a unfolded state, the displaying comprises storing the image content in a first area in a memory, and in response to a bending interaction of bending the third display area in a second direction at an angle within a second predetermined angle range with reference to the second hinge being detected while an image content is displayed on the display when the display is in a unfolded state, the displaying comprises storing the image content in a second area in the memory.

In response to a detection of a bending interaction of bending the first display area in a first direction with reference to the first hinge and unfolding the first display area while a first page of an electronic book (E-book) content is displayed on the display when the display is in a unfolded state, the displaying comprises displaying a previous page of the E-book, and in response to a detection of a bending interaction of bending the third display area in the second direction display with reference to the second hinge and unfolding the third display area while the first page of the E-book content is displayed in the display when the display is in a unfolded state, the displaying comprises displaying a next page of the E-book.

In response to a detection of a bending interaction of bending the display so that a shape of the display is changed while an execution screen of a first application is displayed on the display when the display is in a unfolded state, the performing comprises displaying an execution screen of a different application in the first display area and the third display area based on the changed shape.

In response to a detection of a bending interaction of bending the display so that the first display area is located higher than the third display area while an execution screen of the first application is displayed on the display when the display is in a unfolded state, the displaying comprises displaying an execution screen of a second application corresponding to a most recently displayed guide message in the first display area and displaying at least a part of the execution screen of the first application in the third display area, and in response to a detection of a bending interaction of bending the display so that the third display area is located higher than the first display area being detected while the execution screen of the first application is displayed on the display when the display is in a unfolded state, the displaying comprises displaying an execution screen of a third application related to the first application in the third display area and displaying at least a part of the execution screen of the first application in the first display area.

In response to a detection of a bending interaction of bending the display so that a display area among the first, the second and the third display areas is located higher than other display areas while the first, second and third display areas display a first screen, a second screen and a third screen respectively, the displaying comprises capturing a screen displayed on the display area being located higher than the other display areas.

In response to the first display area being detected as being bent in a direction of a rear side of the display at an angle within a predetermined angle range with reference to the first hinge, the displaying comprises displaying a first image in the first display area and displaying a second image in the second display area and the third display area.

In response to the first display area being detected as being bent in the direction of the rear side of the display at an angle within a predetermined angle range with reference to the first hinge while a camera application is executed, the displaying comprises displaying an image content in the first display area and displaying a live view image obtained from a camera in the second display area and the third display area.

In response to the first display area being detected as being bent in the direction of the rear side of the display at an angle within a first predetermined angle range with reference to the first hinge and in response to the third display area being detected through the detector as being bent in a direction of a front side of the display at an angle within a second predetermined angle range while a shopping application is executed, the displaying comprises displaying a shopping item that a first user searches in the first display area, displaying a shopping item that a second user wishes to share in the second display area, and displaying a shopping item that the third user searches in the third display area.

According to another aspect of another exemplary embodiment, a display including a display panel, a plurality of hinges disposed on the display panel, a controller configured to segment a viewing area of the display panel into a plurality of viewing areas according to positions of the plurality of hinges, and a sensor configured to detect deformation of the display panel at the positions of the plurality of hinges, wherein the controller is further configured to control display of information in the plurality of viewing areas based on the deformation detected by the sensor.

According to the above-described aspects of the exemplary embodiments, it may be possible to provide a user with various user experiences through a user terminal device including a display which may be bent with reference to a plurality of hinges.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
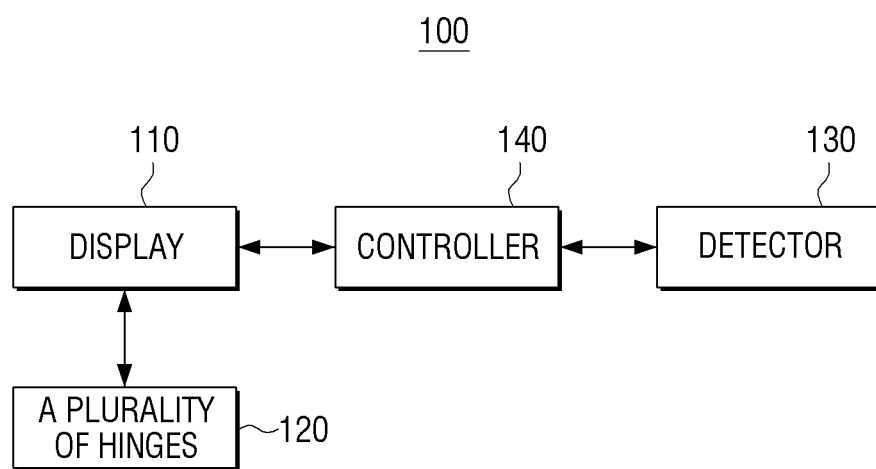
FIG. 1 depicts a block diagram illustrating configuration of a user terminal device, according to an exemplary embodiment.

Hereinafter, certain exemplary embodiments will be described in greater detail with reference to the accompanying drawings.

The exemplary embodiments may vary, and may be provided in different exemplary embodiments. Specific exemplary embodiments will be described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the invention, the specific description is omitted.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless it is intentionally written that way. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor (not shown) except for 'modules' or 'units' that should be realized in a specific hardware.

In the following description, same drawing reference numerals are used for the same elements even in different drawings. The matters defined in the description, such as detailed construction and elements, are provided to assist in a comprehensive understanding. Thus, it is apparent that the exemplary embodiments can be carried out without those specifically defined matters.

FIG. 1 depicts a block diagram illustrating configuration of a user terminal device 100, according to an exemplary embodiment. As illustrated in FIG. 1, the user terminal device 100 includes a display 110, a plurality of hinges 120, a detector 130, and a controller 140. In this case, the user terminal device 100 may be realized as various types of devices such as Television (TV), Personal Computer (PC), laptop PC, mobile phone, tablet PC, Personal Digital Assistant (PDA), MP3 player, kiosk, electronic album, table display device, etc. If a user terminal device is realized as portable device such as mobile phone, tablet PC, PDA, MP3 player, laptop PC, etc., the user terminal device may be referred to a mobile device, but is not limited thereto. Hereinafter, the user terminal device will be referred to as a user terminal device.

The display 110 displays various image data and User Interfaces (UIs). In particular, the display 110 may be realized as a touch screen combined with a touch detector 130. In addition, the display 110 may be bent by a folding line corresponding to the plurality of hinges 120. Specially, in an exemplary embodiment, two hinges 120 are included, and the display 110 may be divided into a first, a second and a third display area by the two hinges 120.

The plurality of hinges 120 allow the display 110 to be bent with reference to a plurality of folding lines corresponding to the plurality of hinges 120. Specially, according to an exemplary embodiment, the user terminal device 110 may include two hinges 120. Meanwhile, the folding line corresponding to the hinge 120 may be a line where two areas among a plurality of display areas included in the display 110 may be completely bent with reference to the folding line.

The detector 130 detects a user interaction. In particular, the detector 130 may include a touch detector for detecting a user touch interaction. In addition, the detector 130 may include a bending detector for detecting a bending interaction of bending the display 110 with reference to a folding line and an unfolding interaction of unfolding the display 110 with reference to a folding line.

The controller 140 controls overall operations of the user terminal device 100. In particular, in response to the display 110 being bent with reference to at least one of the plurality of folding lines, the controller 140 may perform different operations depending upon a bending state of the display 110 detected through the detector 130. In this case, the bending state of the display 110 may include information as to whether the display 110 is bent, a bending angle of the display 110, a shape of the display 110 after bending, etc. In addition, the bending state of the display 110 may represents a state where the display 110 is completely bent, but this is merely an example, and the bending state of the display 110 may represent a state where the display areas are bent within a predetermined angle with reference to a hinge.

In particular, in the present exemplary embodiment, the plurality of hinges 120 may include a first hinge and a second hinge, and the display 110 may be divided into a first display area, a second display area, and a third display area by the first hinge and the second hinge.

According to an exemplary embodiment, in response to a bending interaction of bending the first display area in a first direction, within a predetermined angle range, with reference to the first hinge being detected through the detector 130 while an image content is displayed on the display, when the display 110 is in an unfolded state, the controller 140 may store the image content in a first area in the storage. However, in response to a bending interaction of bending the third display area in a second direction, within a predetermined angle range, with reference to the second hinge being detected through the detector, while an image content is displayed in the display, when the display is in an unfolded state, the controller 140 may store the image content in a second area in the storage. In this case, the first area of the storage may be a common storage area, and the second area may be a discrete storage area, according to an exemplary embodiment.

In addition, in response to a bending interaction of bending the first display area in the first direction, with reference to the first hinge, and unfolding the first display area being detected through the detector 130, while a first page of an E-book content is displayed in the display 110, when the display 110 is in an unfolded state, the controller 140 may control the display 110 to display a previous page of the electronic book (E-book), and in response to a bending interaction of bending the third display area in the second direction, with reference to the second hinge and unfolding the third display area being detected through the detector 130, while the first page of the E-book content is displayed in the display 110, when the display 110 is in an unfolded state, the controller 140 may control the display to display a next page of the E-book.

In addition, in response to a bending interaction of bending the display so that a shape of the display 110 is changed and detected through the detector 130 while an execution screen of a first application is displayed in the display 110 when the display 110 is in an unfolded state, the controller 140 may control the display 110 to display an execution screen of a different application in the first display area and the third display area according to the changed shape, according to an exemplary embodiment.

For example, in response to a bending interaction of bending the display 110 so that the first display area is located above the third display area, being detected through the detector 130 while an execution screen of the first application is displayed in the display 110 when the display 110 is in an unfolded state, the controller 140 may control the display 110 to display an execution screen of a second application corresponding to a most recently displayed guide message in the first display area and display at least a part of the execution screen of the first application in the third display area, according to an exemplary embodiment. However, in response to a bending interaction of bending the display 110 so that the third display area is located above the first display area, being detected through the detector 130 while the execution screen of the first application is displayed in the display 110 when the display 110 is in an unfolded state, the controller 140 may control the display 110 to display an execution screen of a third application related to the first application in the third display area and display at least a part of the execution screen of the first application in the first display area, according to an exemplary embodiment.

In response to a bending interaction of bending the display 110 so that a display area among the first to third display areas is located above the other display areas, being detected through the detector 130 while the first to third display areas display a first to third screens respectively, the controller 140 may capture a screen displayed in the display area located above the other display areas, according to an exemplary embodiment.

For example, in response to a bending interaction of bending the display 110 so that the first display area is located above the other display areas being detected, the controller 140 may capture a first screen displayed in the first display area, according to an exemplary embodiment.

In addition, in response to the first display area being detected as being bent in a direction of a rear side of the display 110, within a predetermined angle range with reference to the first hinge, the controller 140 may control the display 110 to display a first image in the first display area and display a second image in the second display area and the third display area, according to an exemplary embodiment.

For example, in response to the first display area being detected as being bent in the direction of the rear side of the display 110, within a predetermined angle range, with reference to the first hinge while a camera application is executed, the controller 140 may control the display 110 to display an image content in the first display area and display a live view image in the second display area and the third display area, according to an exemplary embodiment.

According to another exemplary embodiment, in response to the first display area being detected as being bent in the direction of the rear side of the display 110, within a first predetermined angle range, with reference to the first hinge and in response to the third display area being detected as being bent in a direction of a front side of the display 110, within a second predetermined angle range, while a shopping application is executed, the controller 140 may control the display 110 to display a shopping item that other user searches in the first display area, display a shopping item that a user wishes to share in the second display area, and display a shopping item that the user searches in the third display area, according to an exemplary embodiment.

According to the above described various exemplary embodiments, a user is able to execute various functions of the user terminal device 100 by using the display 110 which may be bent by the plurality of hinges 120.

Figure 2:
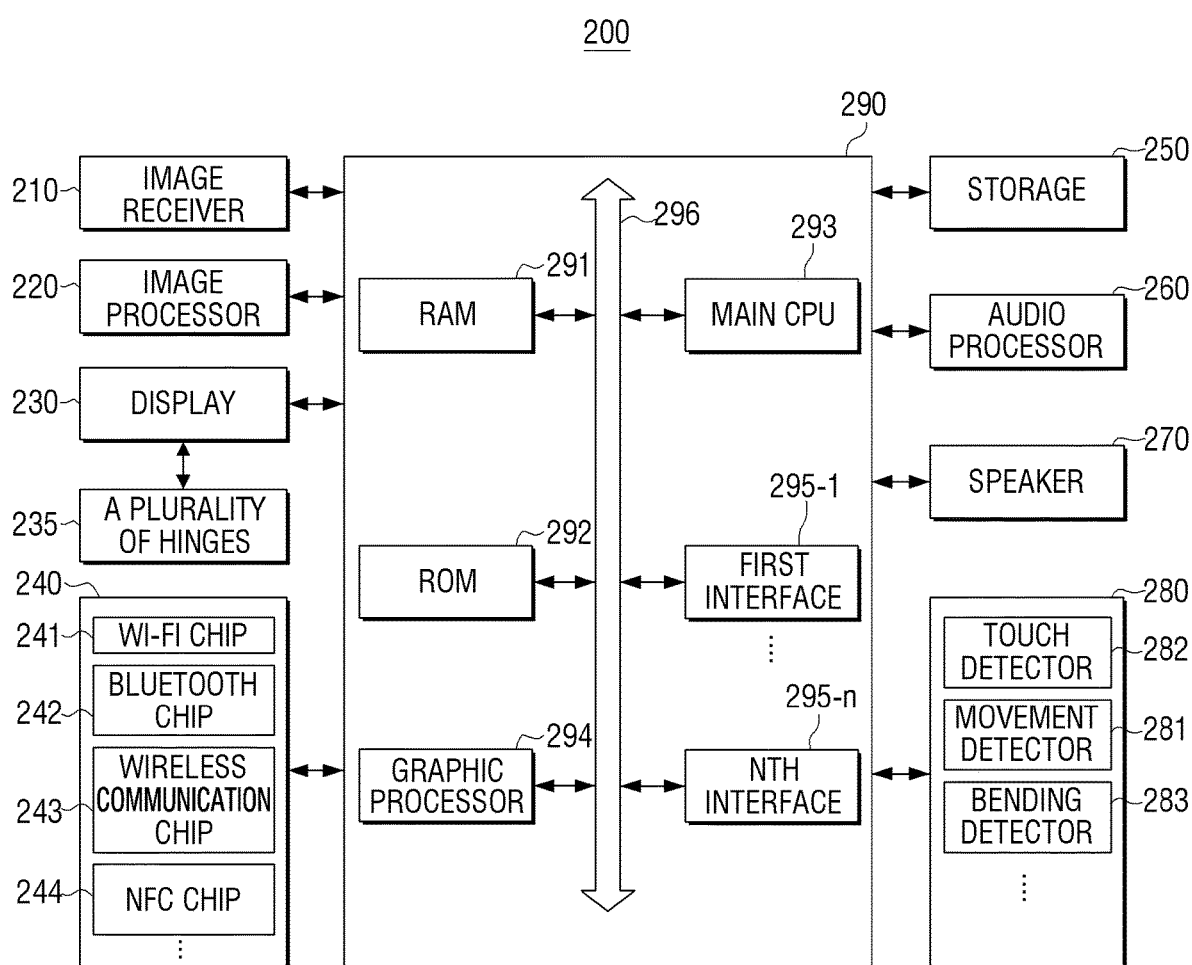
FIG. 2 depicts a block diagram illustrating a detailed configuration of a user terminal device, according to an exemplary embodiment.

Hereinafter, an exemplary embodiment will be described in greater detail with reference to FIGS. 2 to 12B. FIG. 2 depicts a block diagram illustrating detailed configuration of a user terminal device 200, according to an exemplary embodiment. As illustrated in FIG. 2, the user terminal device 200 includes an image receiver 210, an image processor 220, a display 230, a plurality of hinges 235, a communicator 240, a storage 250, an audio processor 260, a speaker 270, a detector 280, and a controller 290.

Meanwhile, FIG. 2 illustrates various components comprehensively, assuming that the user terminal device 200 is an apparatus having various functions such as contents providing function, display function, etc. Accordingly, depending on exemplary embodiments, a part of the components illustrated in FIG. 2 may be omitted or changed, or other components may be further added.

The image receiver 210 receives image data through various sources. For example, the image receiver 210 may receive broadcasting data from an external broadcasting station, Video On Demand (VOD) data in real time from an external server, or image data from an external apparatus.

The image processor 220 processes image data received from the image receiver 210. The image processor 220 may perform various image processing with respect to image data, such as decoding, scaling, noise filtering, frame rate conversion, resolution conversion, etc.

The display 230 displays at least one of a video frame which is generated as the image processor 220 processes image data received from the image receiver 210 and various screens generated by a graphic processor 294.

Figure 3A:
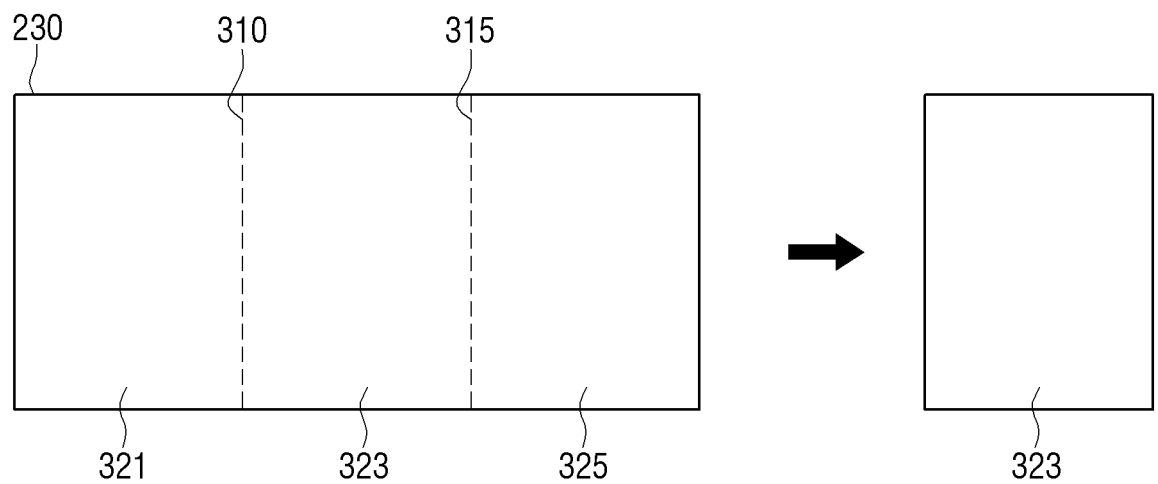
FIGS. 3A to 3C depict views illustrating a user terminal device which may be bent by two hinges, according to an exemplary embodiment.

In particular, as illustrated in FIG. 3A, the display 230 may consist of a first display area 321, a second display area 323, and a third display area 325 with reference to two folding lines 310, 315. In this case, the first folding line 310 may correspond to a location of the first hinge, and the second folding line 315 may correspond to a location of the second hinge.

In addition, the display 230 may be bent with reference to the plurality of hinges 235. In particular, the third display area 325 of the display 230 may be bent in a direction of a rear side of the second display area 323 with reference to the second hinge first, and then the first display area 321 of the display 230 may be bent in the direction of the rear side of the second display area 323 with reference to the first hinge, according to an exemplary embodiment. That is, as illustrated in FIG. 3A, the display 230 may be bent in such a way that the second display area 323 is exposed outside to the user.

Figure 3B:
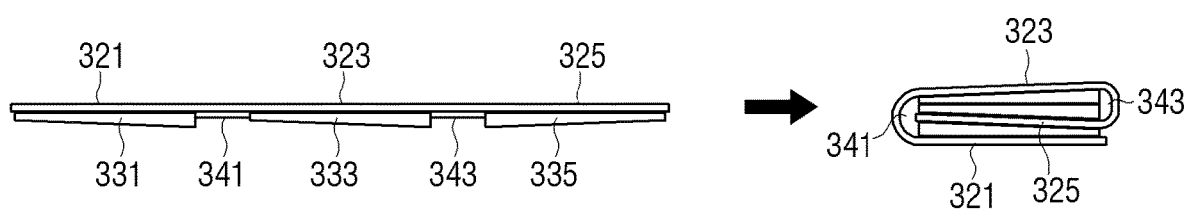
Figure 3C:
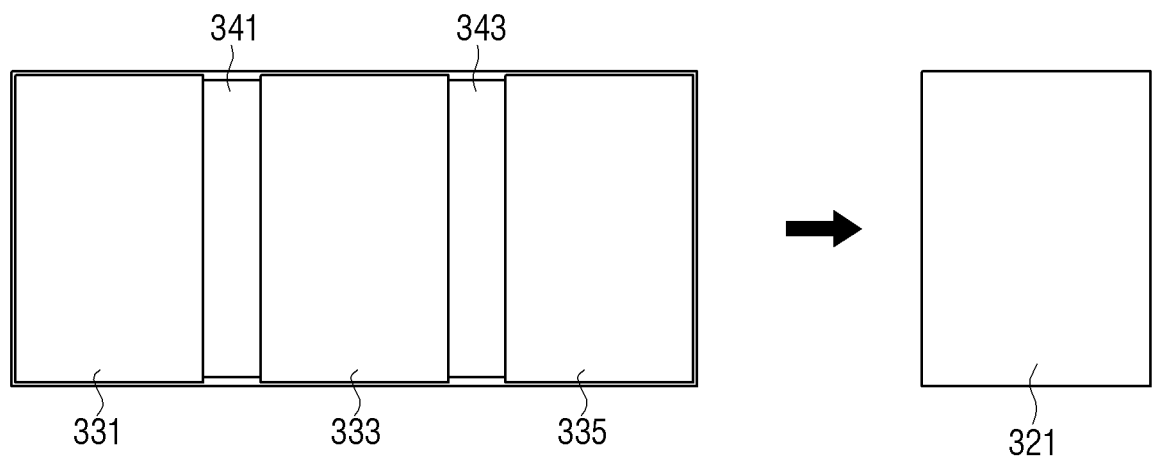

FIGS. 3B and 3C depict views illustrating a side surface and a rear surface of the user terminal device 200 in an unfolded state and a side surface and a rear surface of the user terminal device 200 in a bent state. The rear surface of the user terminal device 200 may include a plurality of covers 331, 333, 335 which respectively correspond to the plurality of display areas 321, 323, 325. In addition, the first hinge 341 and the second hinge 343 may be located between the plurality of covers 331, 333, 335 so that the plurality of display areas 321, 323, 325 may be bent.

Meanwhile, in the above described exemplary embodiment, the first display area 321 and the third display area 325 are bent in the direction of the rear side of the second display area 323 with reference to the first hinge and the second hinge, but this is merely an example. That is, the first display area 321 and the third display area 325 may be bent in a direction of a front side of the second display area 323 with reference to the first hinge and the second hinge, according to another exemplary embodiment.

In addition, in the above described exemplary embodiment, the third display area 325 is bent first, but this is merely an example. That is, the first display area 321 may be bent first, according to another exemplary embodiment.

In addition, in the above described exemplary embodiment, the hinges 341, 343 are located outside the display, but this is merely an example. That is, the hinges 341, 343 may be located inside the display so that the display is bent, according to another exemplary embodiment.

In addition, the display 230 may be realized as a flexible display so as to be bent by a folding line, but this is merely an example. That is, the display 230 may be realized as a plurality of display panels which are connected by a plurality of hinges, according to another exemplary embodiment.

The plurality of hinges 235 allows the display 230 to be bent with reference to corresponding folding lines. In particular, the plurality of hinges 235 may consist of the first hinge and the second hinge, and the first hinge and the second hinge may be located in parallel.

The communicator 240 performs communication with various types of external apparatuses according to various types of communication methods. The communicator 240 may include a Wireless Fidelity (Wi-Fi) chip 241, a Bluetooth chip 242, a wireless communication chip 243, and a Near Field Communication (NFC) chip 244. The controller 290 may perform communication with various external apparatuses using the communicator 240.

In particular, the Wi-Fi chip 241 and the Bluetooth chip 242 perform communication according to a Wi-Fi method and a Bluetooth method, respectively. In the case of the Wi-Fi chip 241 or the Bluetooth chip 242, various connection information such as Subsystem Identification (SSID) and a session key may be transmitted/received first for communication connection and then, various information may be transmitted/received. The wireless communication chip 243 represents a chip which performs communication according to various communication standards such as Institute of Electrical and Electronics Engineers (IEEE), Zigbee, 3rd Generation (3G), 3rd Generation Partnership Project (3GPP), Long Term Evolution (LTE), and so on. The NFC chip 244 represents a chip which operates according to an NFC method which uses 13.56 MHz band among various Radio Frequency-Identification (RF-ID) frequency bands such as 135 kHz, 13.56 MHz, 433 MHz, 860-960 MHz, 2.45 GHz, and so on.

Figure 4:
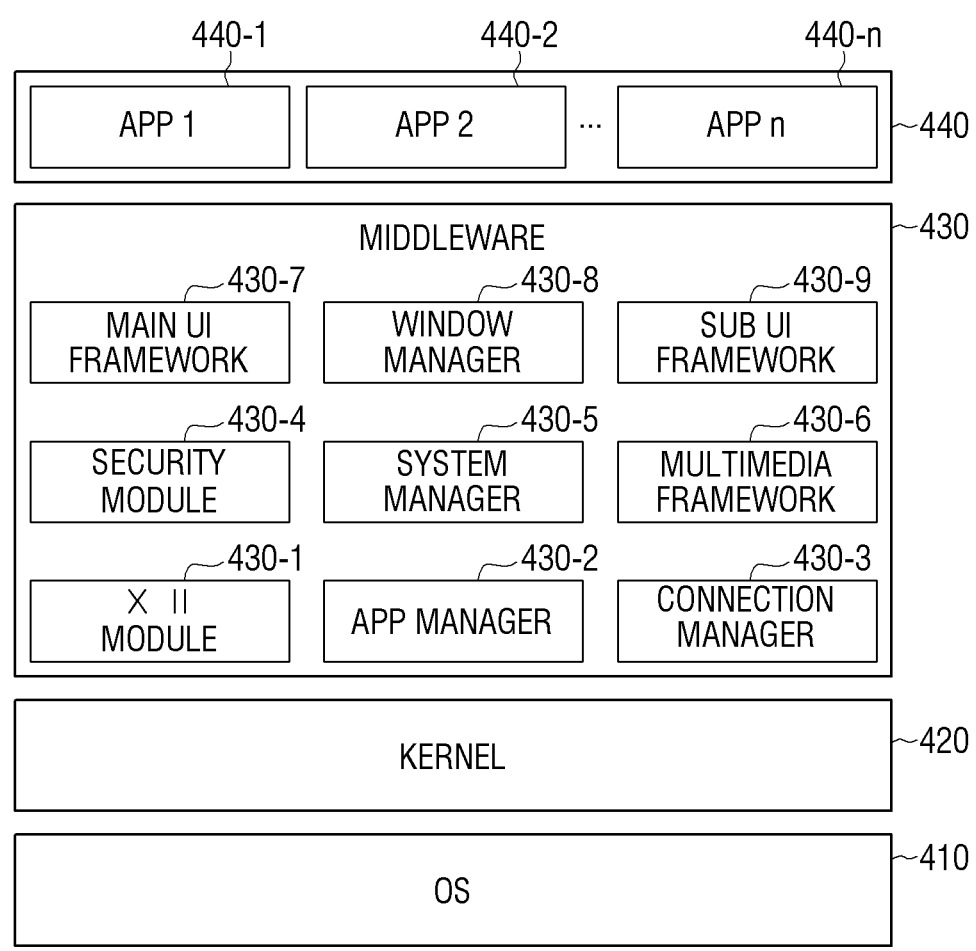
FIG. 4 depicts a view explaining configuration of software stored in a storage, according to an exemplary embodiment.

The storage 250 may store various programs and data necessary to operate the user terminal device 200. Specifically, the storage 250 may store programs and data to configure various screens to be displayed on a main area and a sub area. FIG. 4 depicts a view explaining the structure of software stored in the user terminal device 200. According to FIG. 4, the storage 250 may store software including an Operating System (OS) 410, a kernel 420, middleware 430, an application 440, etc.

The OS 410 controls and manages overall operations of hardware. In other words, the OS 410 manages hardware and is responsible for basic functions such as memory and security.

The kernel 420 serves as a path transmitting various signals detected at the display 230, such as a touch signal, to the middleware 430.

The middleware 430 includes various software modules for controlling the operation of the user terminal device 200. According to FIG. 4, the middleware 430 includes an X11 module 430-1, an APP manager 430-2, a connection manager 430-3, a security module 430-4, a system manager 430-5, a multimedia framework 430-6, a UI framework 430-7, a window manager 430-8, and a sub UI framework 430-9.

The X11 module 430-1 receives various event signals from various hardware provided in the user terminal device 200. Herein, the event may vary, ranging from an event where a user gesture is detected, an event where a system alarm occurs, an event of executing to and event terminating a specific program, etc.

The APP manager 430-2 manages the execution state of various applications 440 which are installed in the storage 250. When an application execution event is detected from the X11 module 430-1, the APP manager 430-2 calls and executes an application corresponding to the event.

The connection manager 430-3 supports wired or wireless network connection. The connection manager 430-3 may include various detailed modules such as a DNET module, a Universal Plug And Play (UPnP) module, etc.

The security module 430-4 supports certification, permission, secure storage, etc. with respect to the hardware.

The system manager 430-5 monitors the state of each element of the user terminal device 200, and provides the monitoring result to other modules. For example, if there is not enough battery left, an error occurs, or connection is cut off, the system manager 430-5 may provide the monitoring result to a main UI framework 430-7 or a sub UI framework 430-9 and may output an alarm message or an alarm sound.

The multimedia framework 430-6 may reproduce multimedia contents stored in the user terminal device 200 or provided from an external source. The multimedia framework 430-6 may include a player module, a camcorder module, a sound processing module, etc. Accordingly, the multimedia framework 430-6 may reproduce various multimedia contents and generate and reproduce screens and sounds.

The main UI framework 430-7 provides various UIs to be displayed on a main area of the display 230, and the sub UI framework 430-9 provides various UIs to be displayed on a sub area. The main UI framework 430-7 and the sub UI framework 430-9 may include an image composite module to configure various objects, a coordinates composite module to calculate coordinates where an object is to be displayed, a rendering module to render the configured object on the calculated coordinates, a 2-dimensional (2D)/3-dimensional (3D) UI toolkit to provide a tool for configuring a UI in 2D or 3D form, etc.

The window manager 430-8 may detect a touch event using a user's body part or pen, or other input events. When such an event is detected, the window manager 430-8 transmits an event signal to the main UI framework 430-7 or the sub UI framework 430-9 so that an operation corresponding to the event is performed.

In addition, if a user touches and drags a screen, various program modules such as a writing module for drawing a line according to a drag trace and an angle calculation module for calculating a pitch angle, a roll angle, a yaw angle, etc. based on a sensor value sensed by a movement detector 281 may be stored.

The application module 440 includes applications 440-1 to 440-n for supporting various functions. For example, program modules for providing various services, such as a navigation program module, a game module, an electronic book module, a calendar module, an alarm management module, etc. may be included. Such applications may be set as default or may be set temporarily by a user when necessary. If an object is selected, the main CPU 293 may execute an application corresponding to the selected object using the application module 440.

The software structure displayed in FIG. 4 is only an example and thus, an exemplary embodiment is not necessarily limited thereto. Thus, part of the structure may be omitted or changed, or new structure may be added, if necessary. For example, the storage 250 may additionally provide various programs such as a sensing module for analyzing signals sensed by various sensors, a messaging module including a messenger program, a Short Message Service (SMS) & Multimedia Message Service (MMS) program, an e-mail program, a call info aggregator program module, a VoIP module, a web browser module, etc.

Referring back to FIG. 2, the audio processor 260 processes audio data of image contents. The audio processor 260 may perform various processing operations such as decoding, amplification, noise filtering, etc. with respect to audio data. The audio data processed by the audio processor 260 may be output to the audio output unit 270.

The audio output unit 270 outputs not only various audio data, which is processed in many ways such as decoding, amplification, and noise filtering by the audio processor 260, but also various alarm sounds or voice messages. In particular, the audio output unit 270 may be realized as a speaker, but this is only an example. The audio output unit 270 may be realized as an output terminal which may output audio data, according to another exemplary embodiment.

The detector 280 detects various user interactions. In particular, the detector 280 may include a touch detector 282, a movement detector 281, and a bending detector 283 as illustrated in FIG. 2.

Specifically, the touch detector 282 may detect a user's touch interaction using a touch panel attached to a rear side of a display panel. The movement detector 281 may detect a movement (for example, a rotation movement) of the user terminal device 100 using at least one of an accelerator sensor, a geomagnetic sensor, and a gyro sensor. The bending detector 283 may detect at least one of whether the user terminal device 200 is bent with reference to a folding line and the angle at which the terminal device 200 is bent using a bending detector, an illuminance sensor, etc.

Meanwhile, the touch detector 282 may activate only a touch sensor disposed on an exposure area while the display 230 is bent and inactivate a touch sensor disposed on the other areas. In this case, the bending state of the display 230 may include both of a state where the display 230 is completely bent with reference to the hinge 241 and 243 and a state where the display areas are bent at a predetermined angle with reference to the hinge 241 and 243, according to an exemplary embodiment.

The controller 290 controls overall operations of the user terminal device 200 using various programs stored in the storage 250.

As illustrated in FIG. 2, the controller 290 includes a Random Access Memory (RAM) 291, a Read-Only Memory (ROM) 292, a graphic processor 294, a main Central Processing Unit (CPU) 293, a first to an nth interface 295-1 to 295-n, and a bus 296. In this case, the RAM 291, the ROM 292, the graphic processor 294, the main CPU 293, the first to the nth interface 295-1-295-n, etc. may be interconnected through the bus 296.

The ROM 292 stores a set of commands for system booting. If a turn-on command is input and thus, power is supplied, the main CPU 293 copies O/S stored in the storage 250 in the RAM 291 according to a command stored in the ROM 292, and boots a system by executing the O/S. When the booting is completed, the main CPU 293 copies various application programs stored in the storage 250, in the RAM 291, and executes the application programs copied in the RAM 291 to perform various operations.

The graphic processor 294 generates a screen including various objects such as an icon, an image, a text, etc. using a computing unit (not shown) and a rendering unit (not shown). The computing unit computes property values such as coordinates, shape, size, and color of each object to be displayed according to the layout of the screen using a control command received from the detector 280. The rendering unit generates a screen with various layouts including objects based on the property values computed by the computing unit. The screen generated by the rendering unit is displayed in a display area of the display 230.

The main CPU 293 accesses the storage 250 and performs booting using the O/S stored in the storage 250. The main CPU 293 performs various operations using various programs, contents, data, etc. stored in the storage 250.

The first to the nth interface 295-1 to 295-n are connected to the above-described various elements. One of the above interfaces may be a network interface which is connected to an external apparatus via a network.

In particular, the controller 290 may perform various functions according to a bending state of the display 230, detected through the bending detector 283.

<Operating Mode>

The controller 290 may operate in a plurality of operating modes according to a bending state of the display 230, detected through the bending detector 283. In this case, the plurality of operating modes may include a phone mode, a note modem and a tablet mode, according to an exemplary embodiment.

Figure 5A:
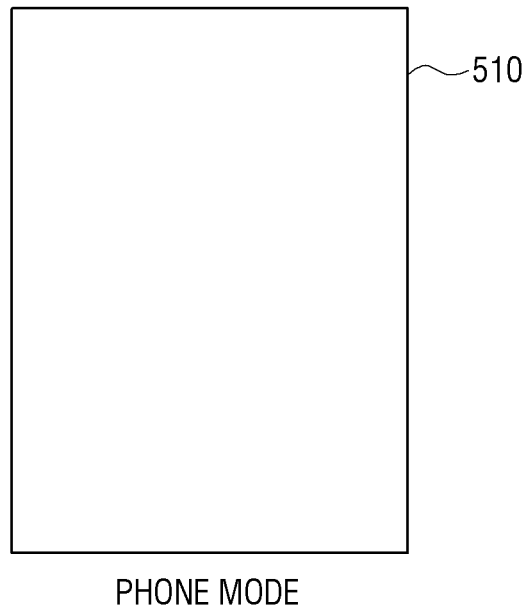
FIGS. 5A to 5C depict views illustrating a plurality of modes according to a bending state of a user terminal device, according to an exemplary embodiment.

Specially, as illustrated in FIG. 5A, in response to each of the first display area 321 and the third display area 325, being detected through the bending detector 283, as being bent in a direction of a rear side of the second display area 323 with reference to two hinges, the controller 290 may operate in a phone mode 510 where an image is displayed in one display area (for example, the second display area), according to an exemplary embodiment.

Figure 5B:
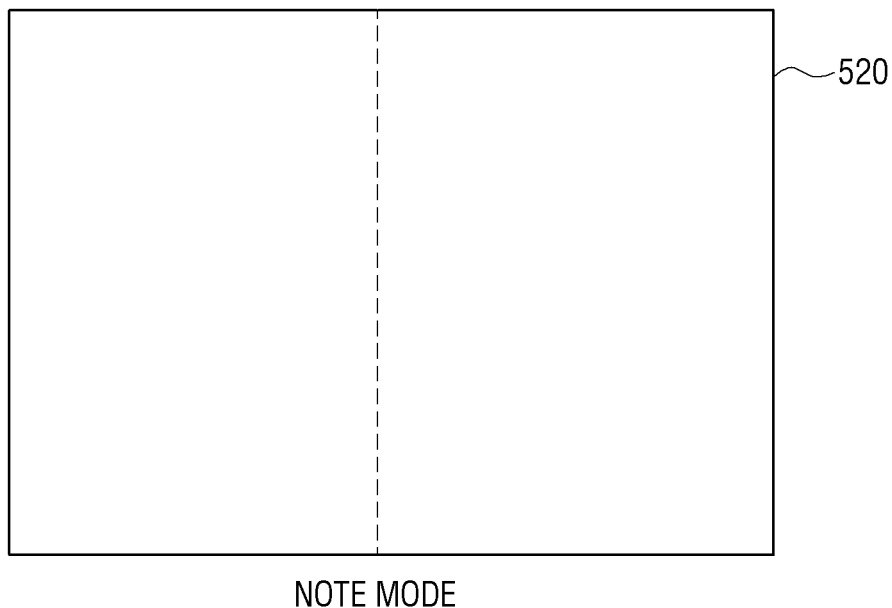

In addition, as illustrated in FIG. 5B, in response to one of the first display area 321 and the third display area 325 being detected through the bending detector 283 as being bent in the direction of the rear side of the second display area 323 with reference to one of the two hinges, the controller 290 may operate in a note mode 520 where images are displayed in two display areas (for example, the first display area and the second display area), according to an exemplary embodiment.

Figure 5C:
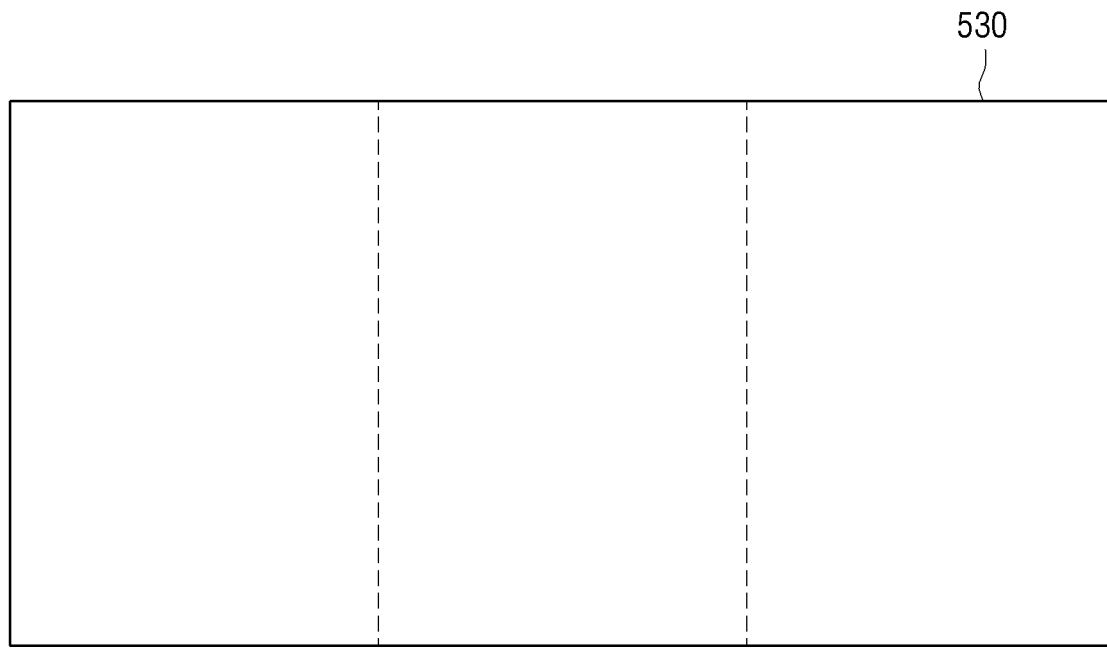

In addition, as illustrated in FIG. 5C, in response to one of the first to the third display areas 321, 323, 325 being detected through the bending detector 283 as being unfolded, the controller 290 may operate in a tablet mode 530 where images are displayed in the first to the third display areas 321, 323, 325, according to an exemplary embodiment.

In particular, the controller 290 may change an area where the touch detector 282 is activated according to the operating mode. For example, in case of the phone mode 510, the controller 290 may activate only a touch sensor corresponding to the second display area 323 out of the touch detector 282 and inactivate the touch sensors corresponding to the first display area 321 and the third display area 323. In addition, in case of the note mode 520, the controller 290 may activate only touch sensors corresponding to the first display area 321 and the second display area 323 out of the touch detector 282 and deactivate the touch sensor corresponding to the third display area 323. In case of the tablet mode 530, the controller 290 may activate touch sensors corresponding to all display areas 321, 323, 325.

In addition, the controller 290 may control the display 230 to vary the display configuration according to an operating mode. In particular, the controller 290 may differently configure a size of a text and an image, an arrangement of a text and an image, and the like according to an operating mode. For example, the controller 290 may display a size of a text and an image when operating in the phone mode 510 to be smaller than a size of a text and an image when operating in the note mode 520 and may display a size of a text and an image when operating in the note mode 520 to be smaller than a size of a text and an image when operating in the tablet mode 530.

<Execution of Functions According to a Bending Interaction>

The controller 290 may perform different functions according to a location of a display area from which a bending interaction is detected.

According to an exemplary embodiment, in response to a bending interaction of bending one of the first to third display areas being detected while an image content is displayed in the display 230, the controller 290 may store the image content in a different area of the storage 250 according to a location of the display area from which the bending interaction is detected.

Figure 6A:
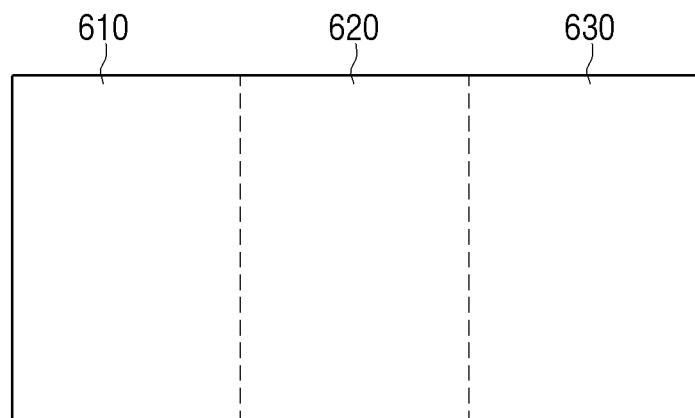
FIGS. 6A to 8B depict views illustrating exemplary embodiments of various functions of a user terminal device performed according to a bending interaction, according to various exemplary embodiments.
Figure 6A:
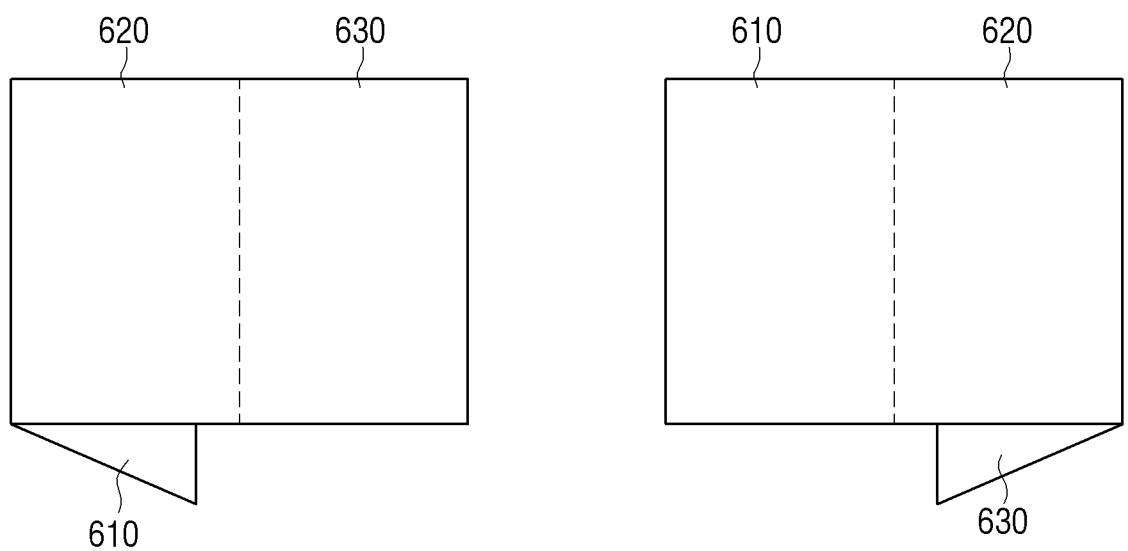

Specially, as illustrated in FIG. 6A, in response to a bending interaction of bending a first display area 610 in a direction of a rear side of the display 230 within a predetermined angle range (for example, 10 degrees to 60 degrees), with reference to the first hinge being detected, through the bending detector 283, while an image content is displayed in the first to third display areas 610 to 630, when the display 230 is in an unfolded state, the controller 290 may store the image content in a first area in the storage 250.

In addition, in response to a bending interaction of bending the third display area 630 in the direction of the rear side of the display 230 within a predetermined angle range (for example, 10 degrees to 60 degrees), with reference to the second hinge being detected, through the bending detector 283, while an image content is displayed in the first to third display areas 610 to 630, when the display 230 is in an unfolded state, the controller 290 may store the image content in a second area in the storage 250.

Figure 6B:
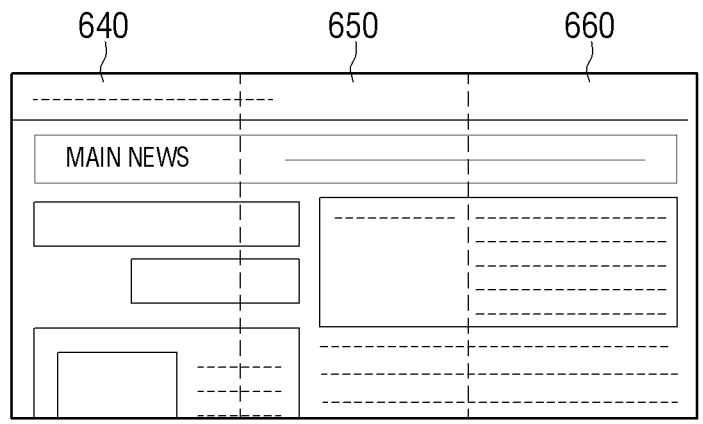
Figure 6B:
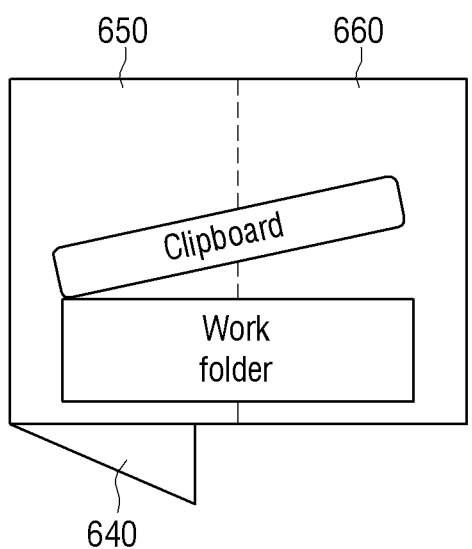
Figure 6B:
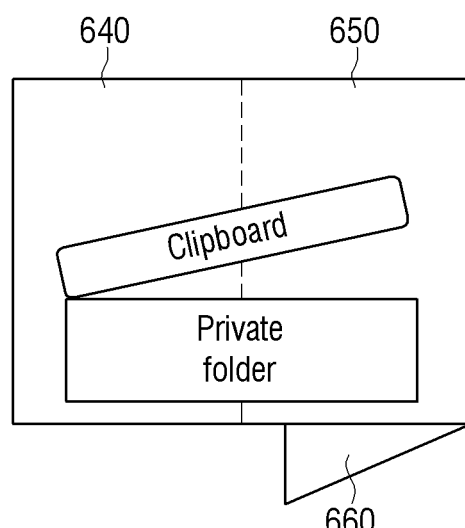

For example, as illustrated in FIG. 6B, in response to a bending interaction of bending the first display area 610 in the direction of the rear side of the display 230 within a predetermined angle range (for example, 10 degrees to 60 degrees), with reference to the first hinge being detected through the bending detector 283, while a news screen of a news application is displayed in the first to third display areas 610 to 630, when the display 230 is in an unfolded state, the controller 290 may store a news article which is currently displayed in the display 230 in a work folder in the storage 250. In addition, in response to a bending interaction of bending the third display area 630 in the direction of the rear side of the display 230 within a predetermined angle range (for example, 10 degrees to 60 degrees) with reference to the second hinge being detected through the bending detector 283, while the news screen of the news application is displayed in the first to third display areas 610 to 630, when the display 230 is in an unfolded state, the controller 290 may store a news article which is currently displayed in the display 230 in a private folder in the storage 250.

According to another exemplary embodiment, in response to a bending interaction of bending a display area from among the first to third display areas and unfolding the display area again being detected while an image content is displayed in the display 230, the controller 290 may change a screen depicting the image content or change the image content to another image content according to a location of the display area from which the bending interaction is detected.

Figure 7A:
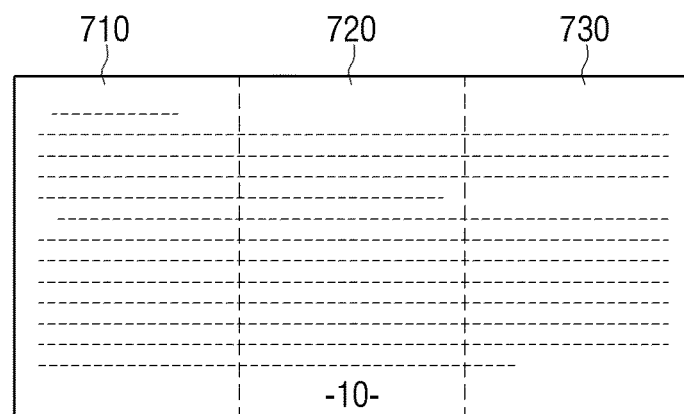
Figure 7A:
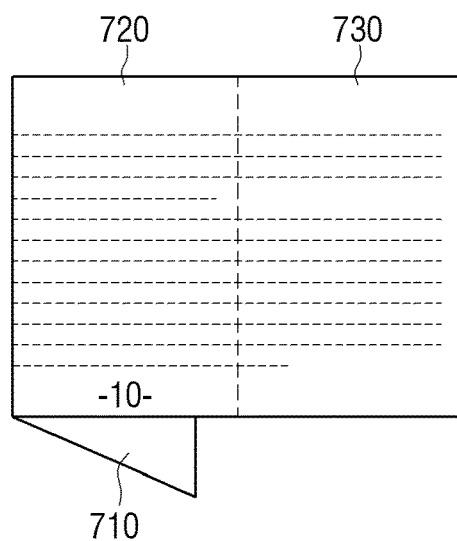
Figure 7A:
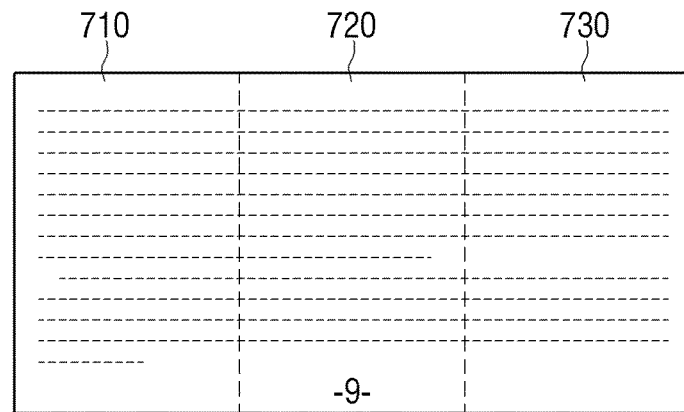

For example, as illustrated in FIG. 7A, in response to a bending interaction of bending a first display area 710 in the direction of the rear side of the display 230 with reference to the first hinge and unfolding the first display area again being detected through the bending detector 283, while a tenth page of a E-book content is displayed in first to third display areas 710 to 730, when the display 230 is in an unfolded state, the controller 290 may control the display 230 to display a ninth page that is a previous page of the E-book.

In addition, as illustrated in FIG. 7B, in response to a bending interaction of bending the third display area 730 in the direction of the rear side of the display 230 with reference to the second hinge and unfolding the third display area again being detected through the bending detector 283, while the tenth page of the E-book content is displayed in the first to third display areas 710 to 730, when the display 230 is in an unfolded state, the controller 290 may control the display 230 to display an eleventh page that is a next page of the E-book.

That is, a user is able to change a page of the E-book content using a bending interaction.

Figure 8A:
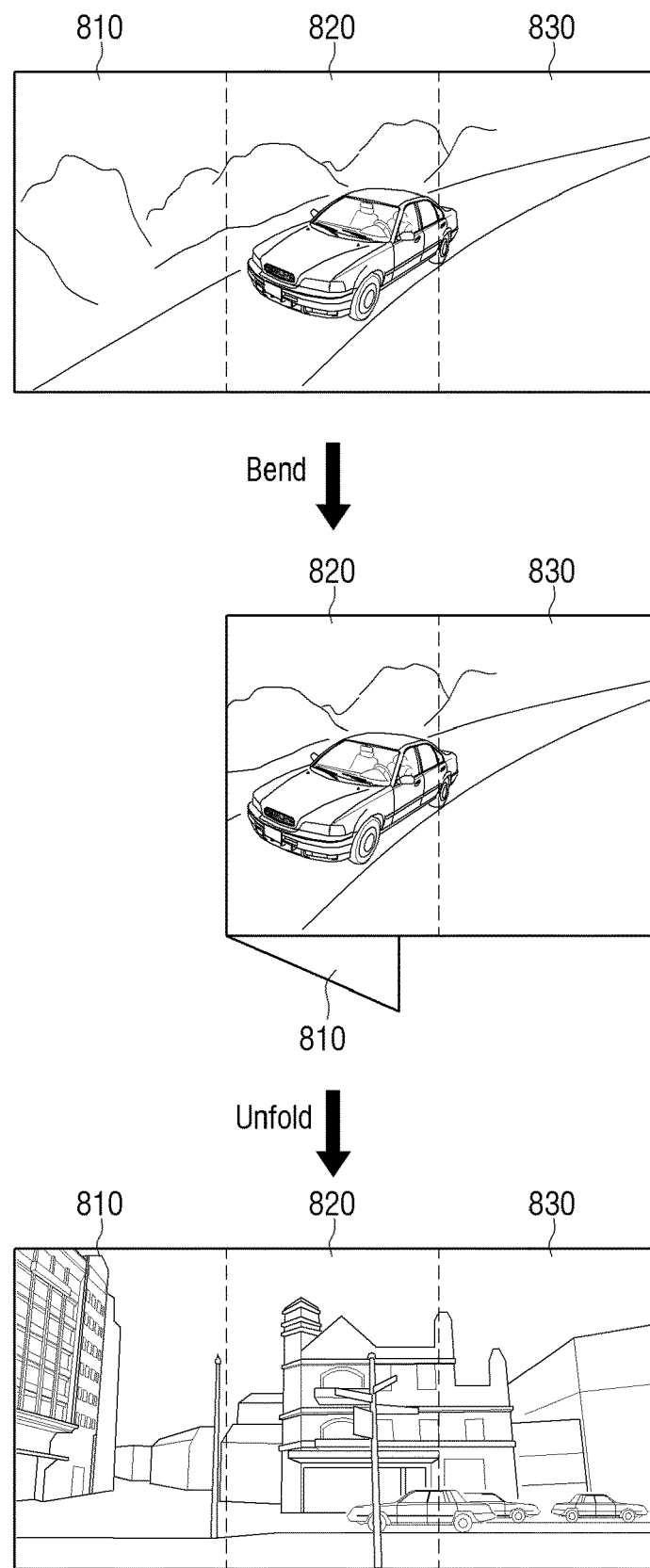

According to another exemplary embodiment, as illustrated in FIG. 8A, in response to a bending interaction of bending the first display area 810 in the direction of the rear side of the display 230, with reference to the first hinge, and unfolding the first display area 810 again being detected through the bending detector 283 while a first picture content is displayed in first to third display areas 810 to 830, and a gallery application is executed when the display 230 is in an unfolded state, the controller 290 may control the display 230 to display a second picture content which is stored in the gallery application.

Figure 8B:
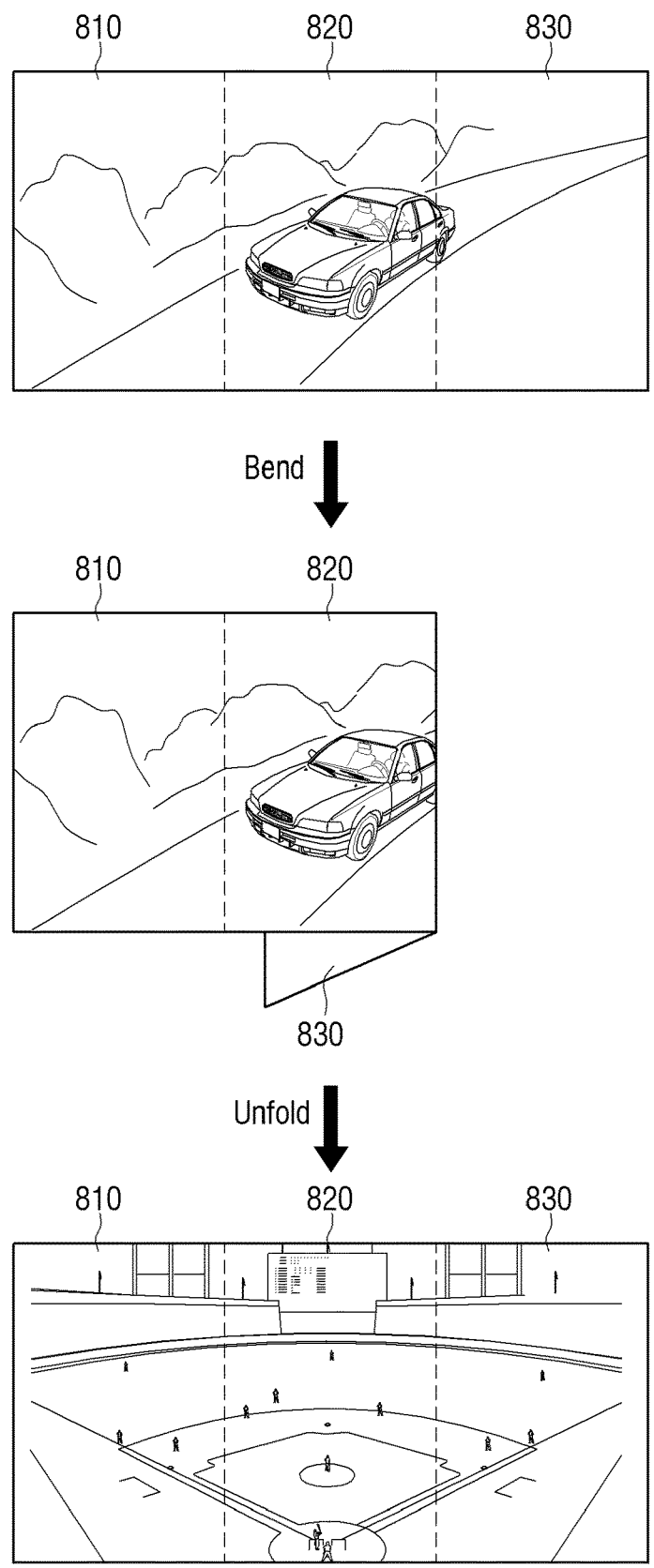

In addition, as illustrated in FIG. 8B, in response to a bending interaction of bending a third display area 830 in the direction of the rear side of the display 230 and unfolding the third display area again with reference to the second hinge being detected through the bending detector 283 while the first picture content is displayed in the first to third display areas 810 to 830, and the gallery application is executed when the display 230 is in an unfolded state, the controller 290 may control the display 230 to display a third picture content which is stored in the gallery application.

That is, a user is able to browse pictures stored in the gallery application using a bending interaction.

<Execution of Functions According to a Shape Change of the Display 230>

In response to a bending interaction of bending the display 230 so that a shape of the display 230 is changed, being detected through the bending detector 283, while an execution screen of a first application is displayed in the display 230 when the display 230 is in an unfolded state, the controller 290 may control the display 230 to display execution screens of different applications in the first display area and the third display area according to the changed shape of the display 230.

Figure 9A:
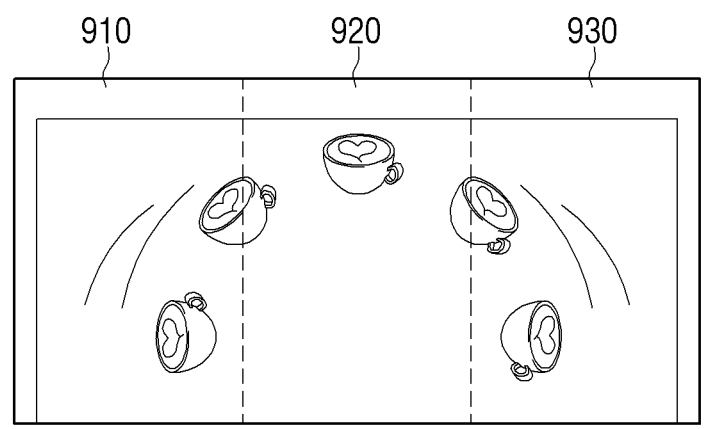
FIGS. 9A to 12B depict views illustrating exemplary embodiments where various functions of a user terminal device are performed according to a shape of the user terminal device being changed in response to a bending interaction, according to various exemplary embodiments.
Figure 9A:
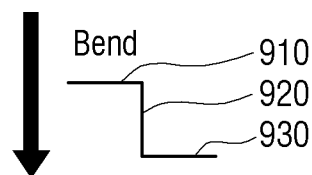
Figure 9A:
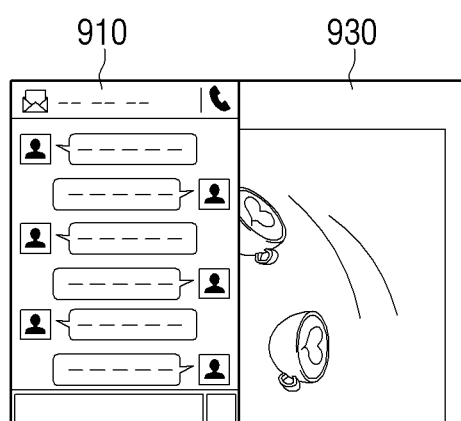

Specially, as illustrated in FIG. 9A, while an execution screen of the gallery application is displayed in the display 230 when the display 230 is in an unfolded state, the bending detector 283 may detect a bending interaction of bending the display 230 so that the first display area 910 is located above the other display areas 920 and 930. For example, the bending detector 283 may detect a bending interaction of bending the first display area 910 and the second display area 920 in a direction of a front side of the display 230 at a predetermined angle (for example, 90 degrees) with reference to the second hinge and bending the first display area 910 in a direction of a rear side of the display 230 at a predetermined angle (for example, 90 degrees) with reference to the first hinge. In response to a bending interaction of bending the display 230 so that the first display area 910 is located above the other display areas 920 and 930, being detected through the bending detector 283, as illustrated in FIG. 9A, the controller 290 may control the display 230 to display an execution screen of a chat application for checking the most recently displayed text message in the first display area 910 and display a part of the execution screen of the gallery application in the third display area 930, according to an exemplary embodiment.

Figure 9B:
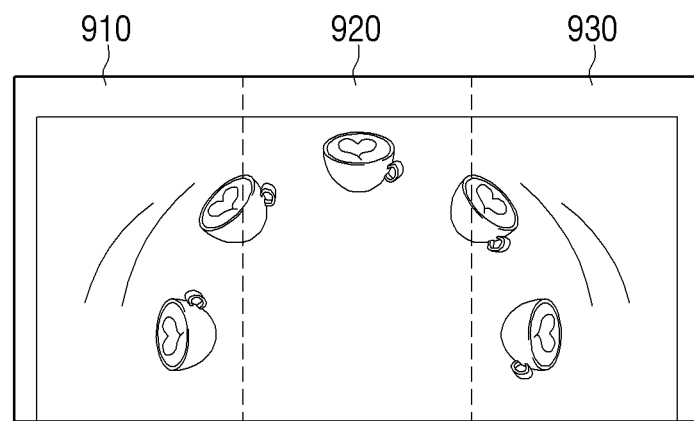
Figure 9B:
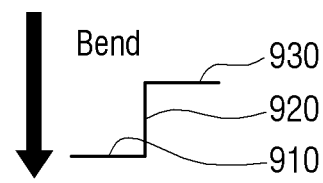
Figure 9B:
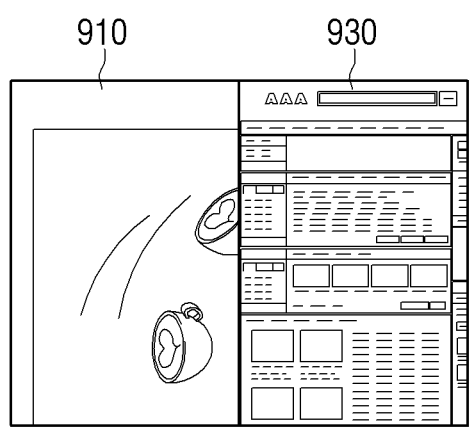

In addition, according to another exemplary embodiment, as illustrated in FIG. 9B, while the execution screen of the gallery application is displayed in the display 230 when the display 230 is in an unfolded state, the bending detector 283 may detect a bending interaction of bending the display 230 so that the third display area 930 is located above the other display areas 910 and 920. For example, the bending detector 283 may detect a bending interaction of bending the second display area 920 and the third display area 930 in the direction of the front side of the display 230 at a predetermined angle (for example, 90 degrees) with reference to the first hinge and bending the third display area 930 in the direction of the rear side of the display 230 at a predetermined angle (for example, 90 degrees) with reference to the second hinge. In response to a bending interaction of bending the display 230 so that the third display area 930 is located above the other display areas 910 and 920 being detected through the bending detector 283, the controller 290 may control the display 230 to display a part of the execution screen of the gallery application in the first display area 910 and display an execution screen of a web search application related to the gallery application in the third display area 930, according to an exemplary embodiment.

That is, the controller 290 may control the display 230 to display different image contents in a plurality of display areas according a bending state of the display 230.

In addition, in response to a bending interaction of bending the display 230 so that a display area among the first to third display areas is located above the other display areas being detected through the bending detector 283, while the first to third display areas respectively display first to third screens, the controller 290 may capture a screen displayed in the display area located above the other display areas.

Figure 10A:
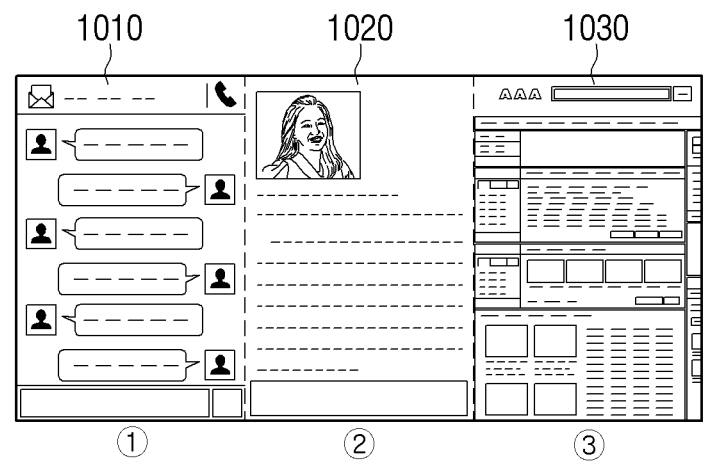
Figure 10A:
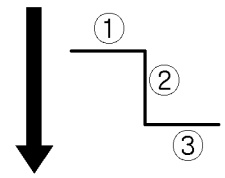
Figure 10A:
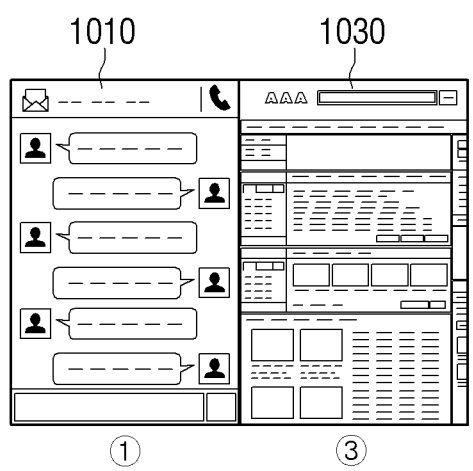

Specially, as illustrated in an upper side of FIG. 10A, the display 230 may display the execution screen of the chat application in a first display area 1010, display an execution screen of the news application in the second display area 1020, and display the execution screen of the web search screen in the third display area 1030, in an unfolded state. In addition, the bending detector 283 may detect a bending interaction of bending the display 230 so that the first display area 1010 is located above the other display areas 1020 and 1030. For example, the bending detector 283 may detect a bending interaction of bending the first display area 1010 and the second display area 1020 in the direction of the front side of the display 230 at a predetermined angle (for example, 90 degrees) with reference to the second hinge and bending the first display area 1010 in the direction of the rear side of the display 230 at a predetermined angle (for example, 90 degrees) with reference to the first hinge. In response to a bending interaction of bending the display 230 so that the first display area 1010 is located above the other display areas 1020 and 1030 being detected through the bending detector 283, the controller 290 may capture the first display screen 1010 which is located higher from among the first display screen 1010 and a third display screen 1030 as illustrated in FIG. 10A.

Figure 10B:
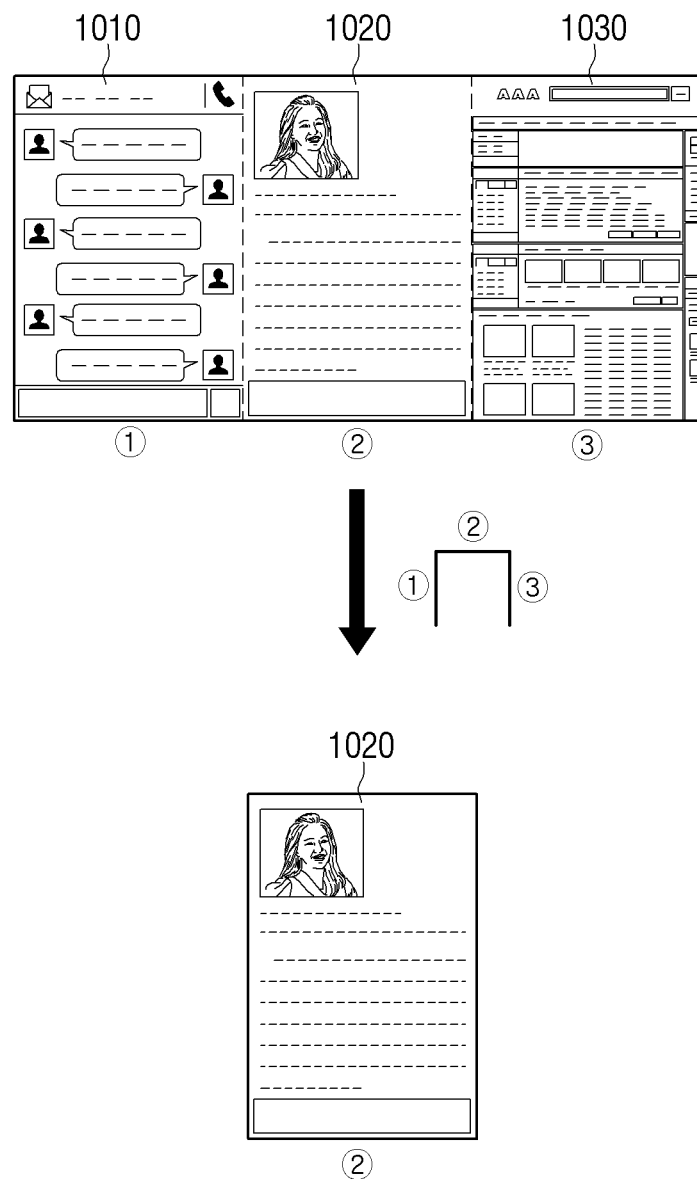

Specially, as illustrated in FIG. 10B, the display 230 may display the execution screen of the chat application in the first display area 1010, display the execution screen of the news application in the second display area 1020, and display the execution screen of the web search screen in the third display area 1030, in an unfolded state. In addition, the bending detector 283 may detect a bending interaction of bending the display 230 so that the second display area 1020 is located above the other display areas 1010 and 1030. For example, the bending detector 283 may detect a bending interaction of bending the first display area 1010 in the direction of the rear side of the display 230 at a predetermined angle (for example, 90 degrees) with reference to the first hinge and bending the third display area 1030 in the direction of the rear side of the display 230 at a predetermined angle (for example, 90 degrees) with reference to the second hinge. In response to a bending interaction of bending the display 230 so that the second display area 1020 is located above the other display areas 1010 and 1030, being detected through the bending detector 283, the controller 290 may capture the second display screen 1020 as illustrated in FIG. 10B.

Figure 10C:
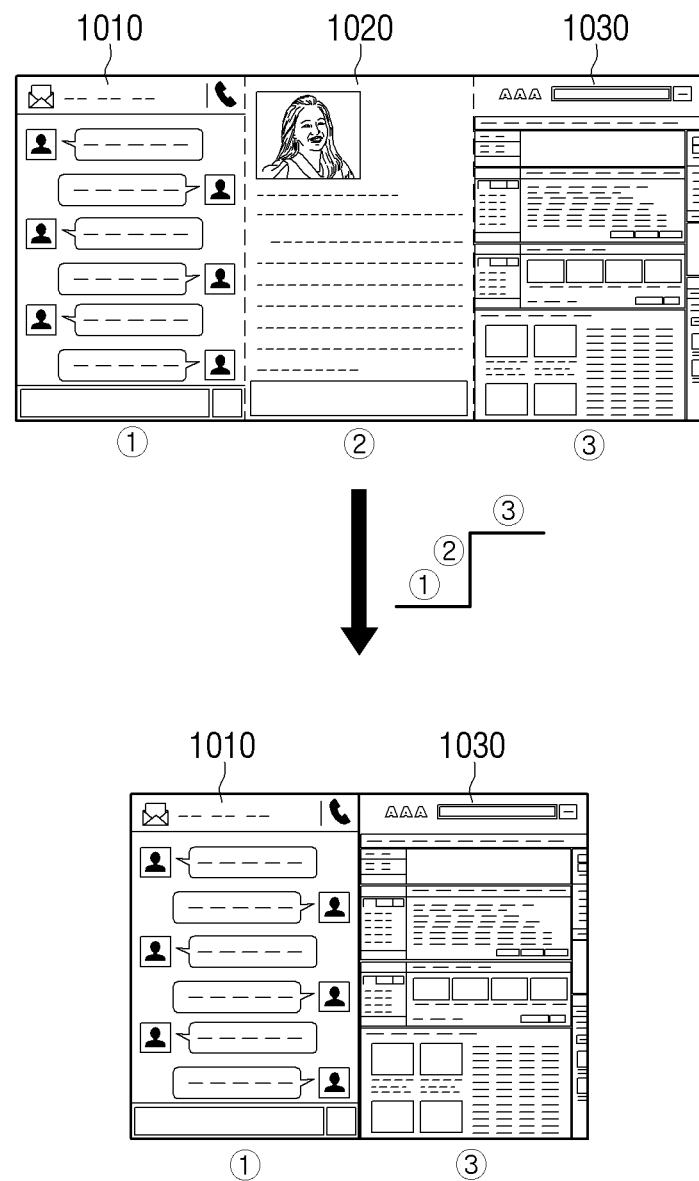

Specially, as illustrated in FIG. 10C, the display 230 may display the execution screen of the chat application in the first display area 1010, may display the execution screen of the news application in the second display area 1020, and may display the execution screen of the web search screen in the third display area 1030, in an unfolded state. In addition, the bending detector 283 may detect a bending interaction of bending the display 230 so that the third display area 1030 is located above the other display areas 1010 and 1020. For example, the bending detector 283 may detect a bending interaction of bending the second display area 1020 and the third display area 1030 in the direction of the front side of the display 230 at a predetermined angle (for example, 90 degrees) with reference to the first hinge and bending the third display area 1030 in the direction of the rear side of the display 230 at a predetermined angle (for example, 90 degrees) with reference to the second hinge. In response to a bending interaction of bending the display 230 so that the third display area 1030 is located above the other display areas 1010 and 1020 being detected through the bending detector 283, the controller 290 may capture the third display screen 1030 which is located in a higher area from among the first display area 1010 and the third display area 1030 as illustrated in FIG. 10C, according to an exemplary embodiment.

That is, the controller 290 may capture a screen displayed in a display area from among a plurality of display areas according to a bending form of the display 230.

Figure 11A:
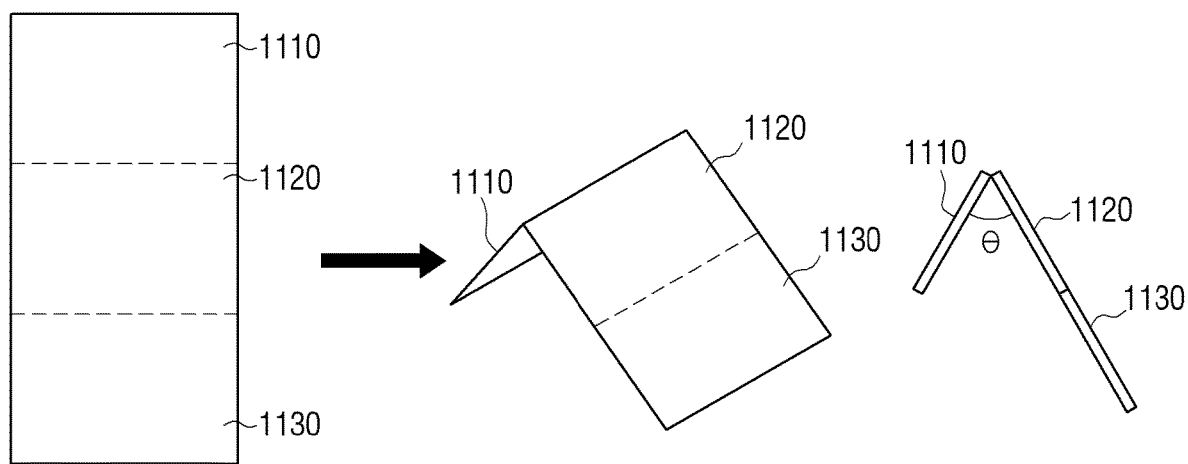

In addition, as illustrated in FIG. 11A, in response to a first display area 1110 being detected as being bent in the direction of the rear side of the display 230 at an angle within a predetermined angle range (θ) (for example, 60 degrees to 120 degrees) with reference to the first hinge, the controller 290 may control the display 230 to display a first image in the first display area 1110 and display a second image in a second display area 1120 and a third display area 1130, according to an exemplary embodiment. In this case, one of the first image and the second image may be an image for a user of the user terminal device 200, and the other image from among the first image and the second image may be an image for another user located on an opposite side of the user using the user terminal device 200.

Figure 11B:
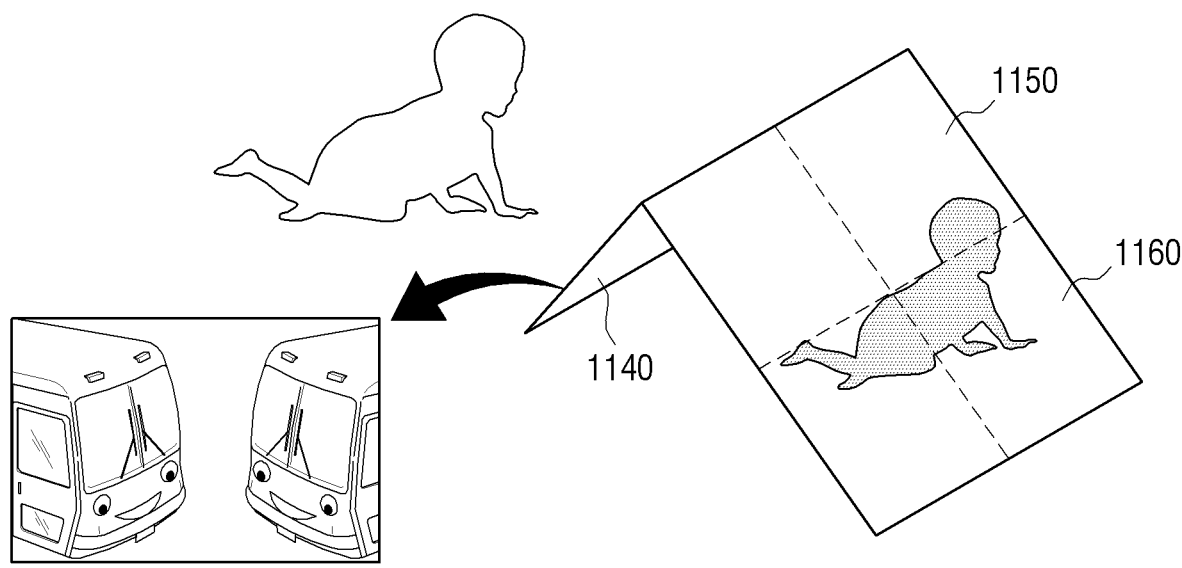

For example, in response to the first display area 1110 being detected as being bent in the direction of the rear side of the display 230 at an angle within a predetermined angle range (for example, 60 degrees to 120 degrees) with reference to the first hinge while a camera application is executed, as illustrated in FIG. 11B, the controller 290 may control the display 230 to display an image content that a subject to be photographed may watch in the first display area 1110 and display a live view image as seen from the camera in the second display area 1120 and the third display area 1130. Accordingly, a user is able to execute a photographing function while the subject to be photographed watches an image content, according to an exemplary embodiment.

Figure 12A:
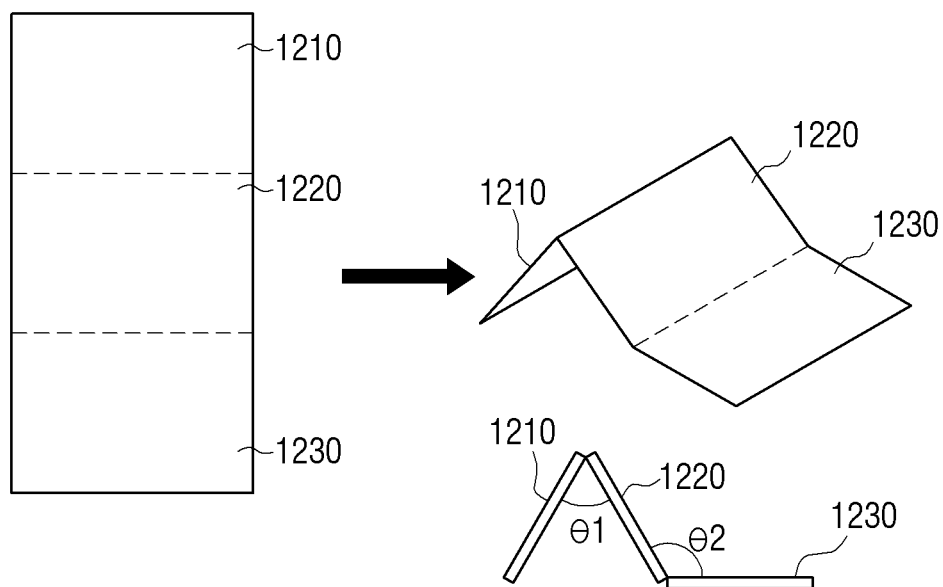

According to another exemplary embodiment, as illustrated in FIG. 12A, in response to a first display area 1210 being detected as being bent in the direction of the rear side of the display 230 at an angle within a first predetermined angle range (θ1) (for example, 60 degrees to 120 degrees), with reference to a first hinge, and a third display area 1230 being detected as being bent in the direction of the front side of the display 230 at an angle within a second predetermined angle range (θ2) (for example, 30 degrees to 60 degrees) with reference to a second hinge, the controller 290 may control the display 230 to display a first screen in the first display area 1210, display a second screen in a second display area 1220, and display a third screen in a third display area 1230. In this case, the third screen may be a screen for the user of the user terminal device 200, the second screen may be a screen that the user of the user terminal device 200 and another user in the opposite side of the user terminal device 200 share, and the first screen may be a screen for the other user located in the opposite side of the user terminal device 200.

Figure 12B:
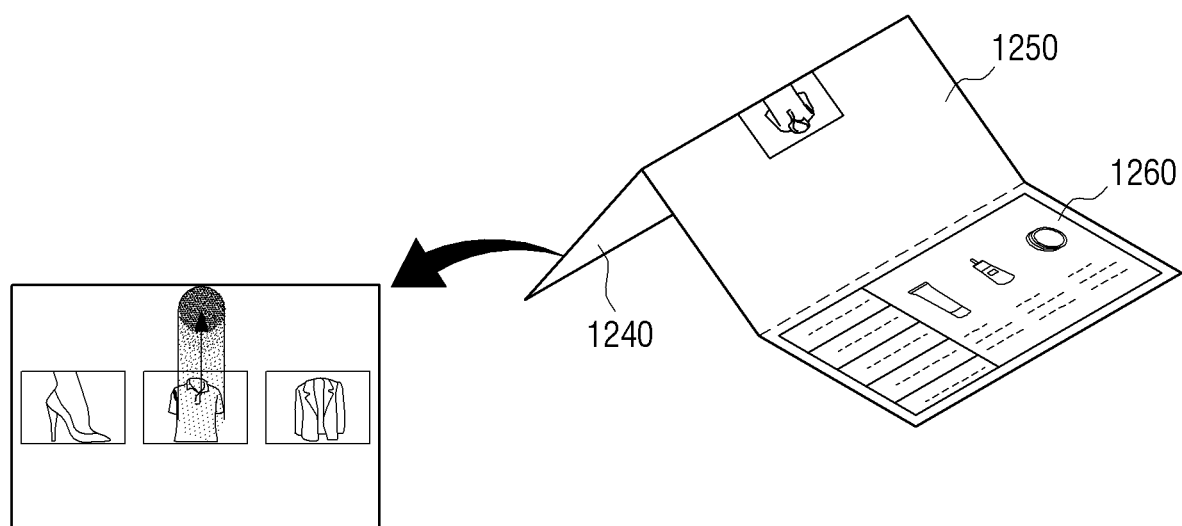

For example, as illustrated in FIG. 12B, in response to the first display area 1240 being detected as being bent in the direction of the rear side of the display 230 at an angle within the first predetermined angle range with reference to the first hinge and in response to the third display area 1260 being detected as being bent in the direction of the front side of the display 230 at an angle within the second predetermined angle range while a shopping application is executed, the controller 290 may control the display 230 to display a shopping item that other user, sitting opposite to a user of the terminal device, searches in the first display area 1240, display a shopping item that a user wishes to share in a second display area 1250, and display a shopping item that the user searches in a third display area 1260.

As described above, by displaying different images in a plurality of display screens when the display 230 is in an unfolded state, with different screens bent at predetermined angles, it is possible to enable a plurality of users to simultaneously use the one user terminal device 200.

Figure 13:
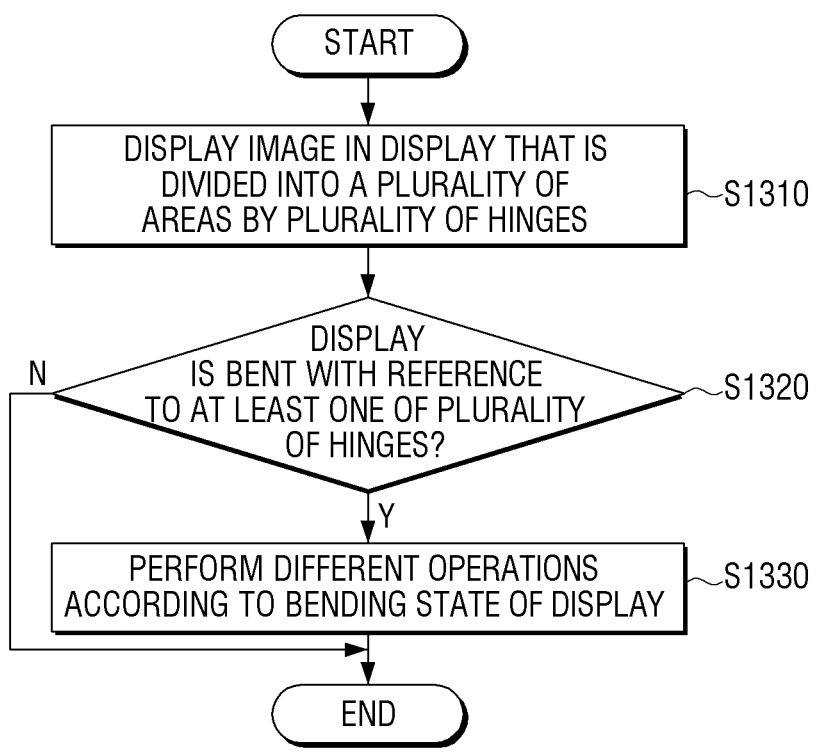
FIG. 13 is a flowchart describing a displaying method of a user terminal device, according to an exemplary embodiment.

Hereinafter, a displaying method of the user terminal device 200 will be described with reference to FIG. 13.

First, the user terminal device 200 displays an image in the display 230 that is divided into a plurality of areas by the plurality of hinges 235 (S1310).

Then, the user terminal device 200 determines whether the display 230 is bent with reference to at least one of the plurality of hinges 235 (S1320).

In response to determining that the display 230 is bent with reference to at least one of the plurality of hinges 235 (S1320—Y), the user terminal device 200 performs different operations according to a bending state of the display 230 (S1330). To be specific, the user terminal device 200 may perform various operations according to a bending state of the display 230 as described in connection with FIGS. 5A to 12B.

By the above described displaying method, it is possible to provide a user with various user experiences through the user terminal device 200, including the display 230 which may be bent with reference to the plurality of hinges 235.

Meanwhile, in the above exemplary embodiments, a surface of the user terminal device 200 consists of the display 230, and the other surface consists of covers 331, 333 and 335 and hinges 341 and 343, but this is merely an example. That is, both surfaces of the user terminal device 200 may be realized as flexible displays. In this case, the hinge may be disposed inside the flexible display or between the flexible displays.

Figure 14A:
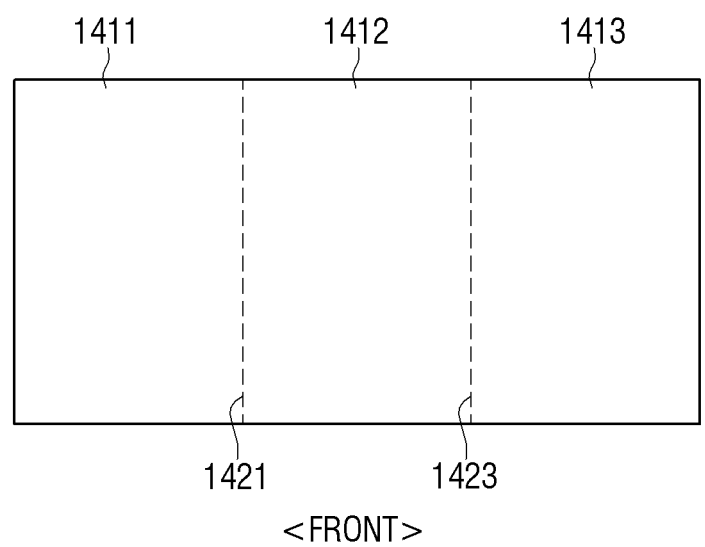
FIGS. 14A to 14G depict views to illustrate exemplary embodiments in which both surfaces of a user terminal device are realized as flexible displays, according to various exemplary embodiments.
Figure 14A:
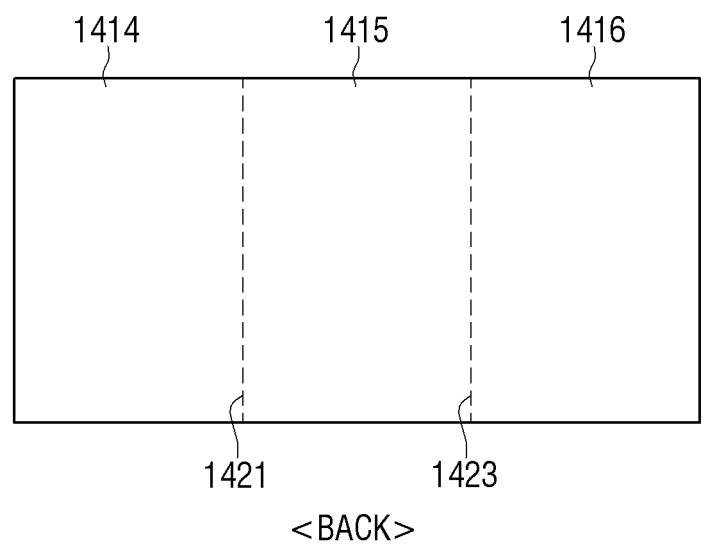

Meanwhile, if both surfaces of the user terminal device are realized as displays, as illustrated in FIG. 14A, a front display may consist of a first display area 1411, a second display area 1412, and a third display area 1413 with reference to a first folding line 1421 and a second folding line 1423, and a rear display may consist of a fourth display area 1414, a fifth display area 1415, and a sixth display area 1416 with reference to the first folding line 1421 and the second folding line 1423, according to an exemplary embodiment.

In addition, in response to one of a plurality of display areas being bent in a front direction with reference to a folding line, an image displayed in a covered area may be displayed in a display area in a rear side, according to an exemplary embodiment. This operation will be described below with reference to FIGS. 14B to 14G.

Figure 14B:
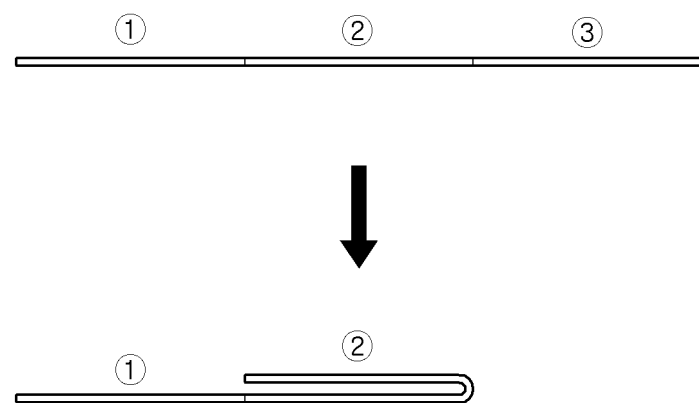

Specially, as illustrated in FIG. 14B, in response to a bending interaction of bending the third display area 1413 in the direction of the front side of the display 230 with reference to the second folding line 1423 being detected while a first image, a second image, and a third image are respectively displayed in each of the first display area 1411, the second display area 1412, and the third display area 1413, the controller 290 may control the display 230 to display the first image in the first display area 1411 and display the second image in the sixth display area 1416, according to an exemplary embodiment. Accordingly, the second image which has been displayed in the second display area 1412 is displayed in the sixth display area 1416 even if a bending interaction is detected, and thus, a user is able to have a user experience as though the second image is continuously displayed in the same location.

Figure 14C:
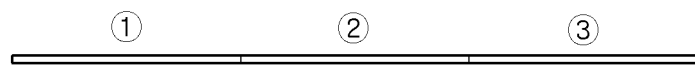
Figure 14C:
Figure 14C:

According to another exemplary embodiment, as illustrated in FIG. 14C, in response to a bending interaction of bending the third display area 1413 in the direction of the rear side of the display 230 with reference to the second folding line 1423 being detected while the first image, the second image, and the third image are respectively displayed in each of the first display area 1411, the second display area 1412, and the third display area 1413, the controller 290 may control the display 230 to display the first image in the first display area 1411 and display the second image in the second display area 1412, according to an exemplary embodiment.

Figure 14D:
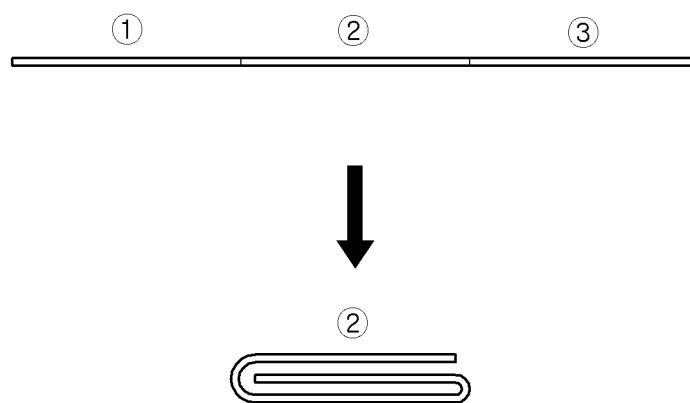

According to another exemplary embodiment, as illustrated in FIG. 14D, in response to a bending interaction of bending the third display area 1413 in the direction of the front side of the display 230 with reference to the second folding line 1423 and a bending interaction of bending the first display area 1411 in the direction of the front side of the display 230 with reference to the first folding line 1421, being detected while the first image, the second image, and the third image are respectively displayed in each of the first display area 1411, the second display area 1413, and the third display area 1415, the controller 290 may control the display 230 to display the second image in the fourth display area 1414. Accordingly, the second image which has been displayed in the second display area 1412 is displayed in the fourth display area 1414 even if a bending interaction is detected, and thus, the user is able to have a user experience as though the second image is continuously displayed in the same location.

Figure 14E:
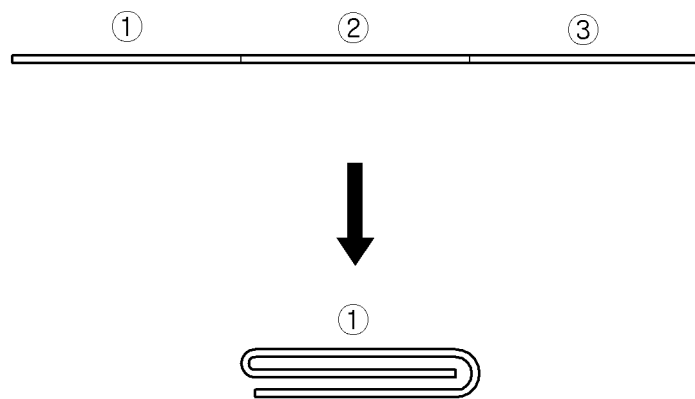

According to another exemplary embodiment, as illustrated in FIG. 14E, in response to a bending interaction of bending the second display area 1412 and the third display area 1413 in the direction of the front side of the display 230 with reference to the first folding line 1421 and bending the third display area 1413 in the direction of the front side of the display 230 with reference to the second folding line 1423 being detected while the first image, the second image, and the third image are respectively displayed in each of the first display area 1411, the second display area 1412, and the third display area 1413, the controller 290 may control the display 230 to display the first image in the fifth display area 1415. Accordingly, the first image which has been displayed in the first display area 1411 is displayed in the fifth display area 1415 even if a bending interaction is detected, and thus, the user is able to have a user experience as though the first image is continuously displayed in the same location.

Figure 14F:
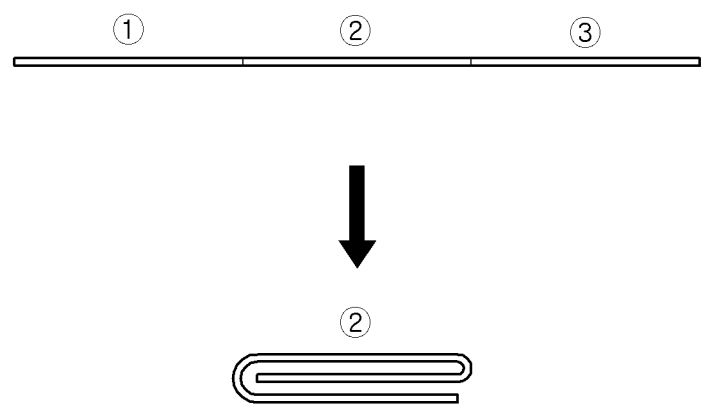

According to another exemplary embodiment, as illustrated in FIG. 14F, in response to a bending interaction of bending the first display area 1411 in the direction of the rear side of the display 230 with reference to the first folding line 1421 and bending the third display area 1413 in the direction of the rear side of the display 230 with reference to the second folding line 1423 being detected while the first image, the second image, and the third image are respectively displayed in each of the first display area 1411, the second display area 1412, and the third display area 1413, the controller 290 may control the display 230 to continuously display the second image in the second display area 1412.

Figure 14G:
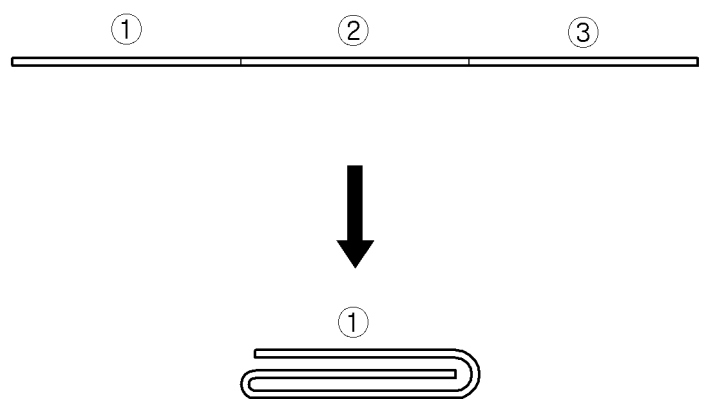

According to another exemplary embodiment, as illustrated in FIG. 14G, in response to a bending interaction of bending the third display area 1413 in the direction of the rear side of the display 230 with reference to the second folding line 1423 and bending the second display area 1412 in the direction of the rear side of the display 230 with reference to the first folding line 1421 being detected while the first image, the second image, and the third image are respectively displayed in each of the first display area 1411, the second display area 1412, and the third display area 1413, the controller 290 may control the display 230 to display the first image in the first display area 1411.

A displaying method of a user terminal device according to various exemplary embodiments may be realized as a program and provided in a user terminal device. Specifically, a non-transitory computer readable medium which stores a program including a controlling method of a user terminal device may be provided.

Specifically, the non-transitory readable medium may refer to a medium which may store data semi-permanently rather than storing data for a short time such as a register, a cache, and a memory and may be readable by an apparatus.

The non-transitory readable medium may be compact disc (CD), a digital versatile disk (DVD), a hard disk, a Blu-ray disk, a universal serial bus (USB), a memory card, and a read-only memory (ROM), etc.

The foregoing embodiments and advantages are merely exemplary and are not to be construed as limiting. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A user terminal device comprising:
    a display configured to be divided into a plurality of display areas along a plurality of folding lines;
    a plurality of hinges configured for bending the display along the plurality of folding lines;
    a detector configured to detect a bending state of the display; and
    a controller configured to, in response to a detection of the display being bent along at least one of the plurality of folding lines, perform different operations based on the bending state of the display,
    wherein the controller is further configured to:
        in response to a detection of the display being bent along a first folding line from among the plurality of folding lines while a first screen is displayed on the display in an unfolding state and unfolding the display, control the display to display a second screen which is a next screen of the first screen, and
        in response to a detection of the display being bent along a second folding line from among the plurality of folding lines while the first screen is displayed on the display in the unfolding state and unfolding the display, control the display to display a third screen which is a previous screen of the first screen.

2. The user terminal device as claimed in claim 1, wherein the plurality of hinges include a first hinge and a second hinge, and
    wherein the display is divided into a first display area and a second display area along the first hinge, and the display is divided into the second display area and a third display area along the second hinge.

3. The user terminal device as claimed in claim 2, wherein the controller is further configured to:
    in response to a detection of a bending interaction of bending the first display area in a first direction with reference to the first hinge and unfolding the first display area while a first page of an electronic book (E-book) content is displayed on the display when the display is in an unfolded state through the detector, control the display to display a previous page of the first page, and
    in response to a detection of a bending interaction of bending the third display area in a second direction with reference to the second hinge and unfolding the third display area while the first page of the E-book content is displayed in the display when the display is in the unfolded state through the detector, control the display to display a next page of the first page.

4. A displaying method of a user terminal device, the displaying method comprising:
    displaying an image content on a display configured to be divided into a plurality of display areas along a plurality of hinges; and
    performing different operations based on a bending state of the display in response to the display being bent by at least one of the plurality of hinges,
    wherein the performing comprises:
        in response to a detection of the display being bent along a first folding line from among a plurality of folding lines while a first screen is displayed on the display in an unfolding state and unfolding the display, displaying a second screen which is a next screen of the first screen, and
        in response to a detection of the display being bent along a second folding line from among the plurality of folding lines while the first screen is displayed on the display in the unfolding state and unfolding the display, displaying a third screen which is a previous screen of the first screen.

5. The displaying method as claimed in claim 4, wherein the plurality of hinges include a first hinge and a second hinge, and
    wherein the display is divided into a first display area and a second display area along the first hinge, and the display is divided into the second display area and a third display area along the second hinge.

6. The displaying method as claimed in claim 5, wherein the performing further comprises:
    in response to a detection of a bending interaction of bending the first display area in a first direction with reference to the first hinge and unfolding the first display area while a first page of an electronic book (E-book) content is displayed on the display when the display is in an unfolded state, displaying a previous page of the first page, and
    in response to a detection of a bending interaction of bending the third display area in a second direction with reference to the second hinge and unfolding the third display area while the first page of the E-book content is displayed in the display when the display is in the unfolded state, displaying a next page of the first page.

* * * * *